(12) United States Patent
Abe

(10) Patent No.: US 7,116,434 B2
(45) Date of Patent: Oct. 3, 2006

(54) CONTROLLING A CLUSTER OPERATION

(75) Inventor: Yoshinori Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 09/921,556

(22) Filed: Aug. 6, 2001

(65) Prior Publication Data
US 2002/0054316 A1 May 9, 2002

(30) Foreign Application Priority Data
Aug. 10, 2000 (JP) .............................. 2000-243324
Sep. 26, 2000 (JP) .............................. 2000-292927

(51) Int. Cl.
*G06F 3/12* (2006.01)
(52) U.S. Cl. .................... 358/1.15; 358/1.14; 358/1.13
(58) Field of Classification Search ............... 358/1.15, 358/1.14, 1.12, 1.13
See application file for complete search history.

(56) References Cited

U.S. PATENT DOCUMENTS

| | | | | |
|---|---|---|---|---|
| 5,457,516 A | * | 10/1995 | Kim ............................ | 399/37 |
| 6,130,757 A | * | 10/2000 | Yoshida et al. ............ | 358/1.15 |
| 6,268,925 B1 | * | 7/2001 | Yamanaka .................. | 358/1.14 |
| 6,407,826 B1 | * | 6/2002 | Hashimoto et al. ......... | 358/296 |
| 6,650,431 B1 | * | 11/2003 | Roberts et al. ............. | 358/1.15 |
| 6,753,973 B1 | * | 6/2004 | Hashimoto et al. ........ | 358/1.14 |
| 6,970,261 B1 | * | 11/2005 | Robles ....................... | 358/1.15 |
| 2001/0055123 A1 | * | 12/2001 | Ryan et al. ................ | 358/1.12 |

* cited by examiner

*Primary Examiner*—Dov Popovici
(74) *Attorney, Agent, or Firm*—Fitzpatrick, Cella, Harper & Scinto.

(57) ABSTRACT

To perform a cluster operation of a plurality of multi-function devices, if the number of devices in a stand-by state is smaller than a required number of devices, a device in a sleep state is restored to the stand-by state. In this case, a device that returns to the stand-by state earliest is selected and restored to the stand-by state.

21 Claims, 18 Drawing Sheets

CONTROLLING A CLUSTER OPERATION

FIELD OF THE INVENTION

The present invention relates to an information processing system and method, and more particularly to an information processing system and method capable of performing the multi-function operation.

BACKGROUND OF THE INVENTION

Conventionally, a digital copying machine has been well known in which an original to be copied is read, the read image data is stored in a storage device such as a hard disk, and the image data is output via a network to other printer unit and printed. Also, another digital copying machine has appeared having a multiplicity of functions, in addition to the proper copying function, including a print function of printing out the print data input from an external computer and a facsimile function of receiving the facsimile (FAX) from the public line. The copying machine having such multiple functions is referred to as a multi-function device.

This multi-function device is more intelligent than a single function copying machine or facsimile device, and has high extendability for the future.

The space for installation is reduced with one multi-function device as compared with a plurality of single function devices to provide for multiple functions.

Such multi-function device is required to store unnecessary application programs or the data within the device, although it has high extendability, and needs more memory capacity to be mounted as the specification or function increases.

It is also provided with a large capacity memory device such as a hard disk to store a large amount of data. Further, owing to high functions, the multi-function device needs a complex installation procedure in installing, resulting in a longer installation time, and an enormous amount of documents including an installation procedure manual, or bringing about a necessity to download more data and store it for the online manual.

The multi-function device has an energy saving function of automatically transferring to a sleep state to reduce a consumption power of the device, if not used for a predetermined time.

A cluster system is well known having a clustering function of effecting the print out process or other process at higher rate by connecting a plurality of multi-function devices to a network.

However, since the energy saving function of each device operates asynchronously with the clustering function, there is a case in starting the clustering operation where the number of devices in a standby state is smaller than the number of devices required in the cluster system. In this case, it was required that each device in a sleep state was once activated, and then the clustering operation was started again.

In this way, if the energy saving function provided for each device is effectively performed, the initiation time during the clustering operation is longer, impeding the high speed processing with the cluster system.

On the contrary, in order to place each device in a clustering operable state in a short time, it was required the energy saving function provided for each device might be inactivated, and each device might always be placed in an operable state. Therefore, there was the problem that the energy saving function provided for each device became unavailable.

SUMMARY OF THE INVENTION

The present invention has been achieved to solve the aforesaid problem, and it is an object of the invention to provide an information processing device, system and method in which if the number of multi-function devices in a stand-by state is smaller than the number of devices constituting a cluster system in starting the cluster operation, an insufficient number of multi-function devices are transferred to the stand-by state before the cluster process is started, whereby the time up to starting the cluster process is shortened, and the high speed of the cluster operation is not lessened.

Further, it is another object of the invention to provide an information processing device, system and method in which the device capable of changing the state in a short time is selected as one transferring from a sleep state to a stand-by state to shorten the time up to starting the cluster process.

It is another object of the invention to provide an information processing device, system and method in which total processing efficiency of the cluster system is enhanced and the high speed of the cluster operation is not lessened by relieving the processing load with the device taking much time to transfer from the sleep state to the stand-by state.

Further, it is another object of the invention to provide an information processing device, system and method in which when the multi-function device having an energy saving function is a constituent member of a cluster system, the device is transferred to the sleep state upon an instruction from the manager for managing the cluster system, whereby the high speed of the clustering operation and the energy saving function can be consistent.

To accomplish the above objects, according to one aspect of the invention, there is provided a control device for controlling a cluster operation of a plurality of devices, comprising a restoring portion for restoring a device in an energy saving state to a stand-by state, if the number of devices in the stand-by state is smaller than a required number of devices for the cluster operation, and a distribution portion for distributing a job to each device, if a sum of the number of devices in the stand-by state and the number of devices restored to the stand-by state by the restoring portion reaches the required number.

According to the another aspect of the invention, there is provided a control device for controlling a cluster operation of a plurality of devices, comprising a selecting portion for selecting an insufficient number of devices from among the devices in an energy saving state, if the number of devices in a stand-by state is less than a required number of devices for the cluster operation, and a distribution portion for distributing a job to each device already in the stand-by state and each device in the energy saving state that is selected by the selecting portion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

One preferred embodiment of the present invention will be described below in detail by reference to the accompanying drawings. In the following, a control method for clustering is mainly intended for a multi-function device connected to a network.

Figure 1:
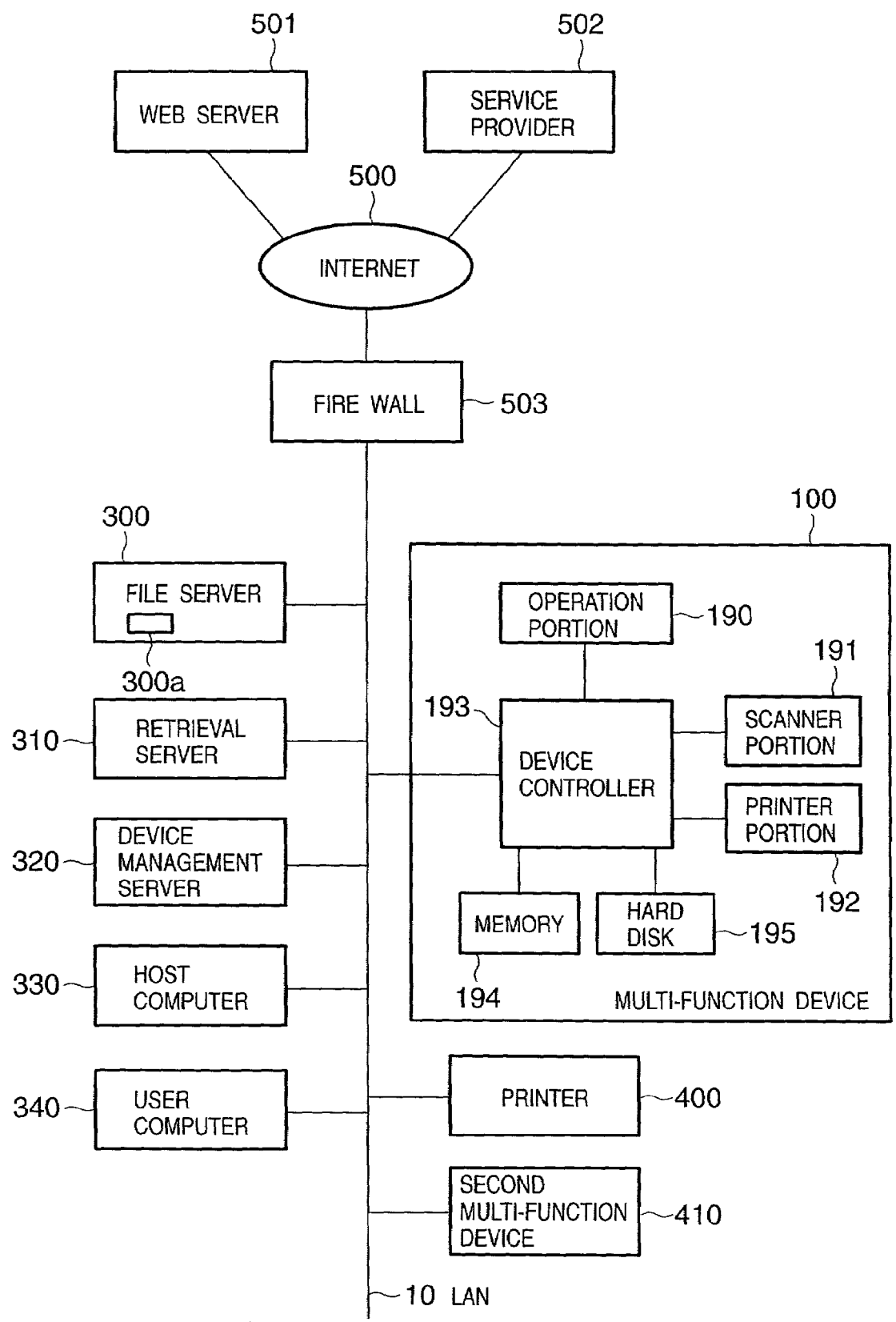
FIG. 1 is a block diagram showing a system configuration according to one embodiment of the present invention.

FIG. 1 is a block diagram showing a system configuration according to one embodiment of the present invention. A network system is composed of a multi-function device 100, the servers 300, 310, 320, and the computers 330, 340, which are connected via a network.

In FIG. 1, the multi-function device 100 has principally a function of making the input and output of an image to process the image data.

The multi-function device 100 comprises an operation portion 190 for enabling the user to perform an input operation for various kinds of instructions, a scanner portion 191 for scanning an image in accordance with an instruction from the operation portion 190, a host computer 330 or a user computer 340, a printer portion 192 for printing the image data from the scanner portion 191 and the data from the computers 330, 340, and a device controller 193 for controlling the input/output of the image data into or from the scanner portion 191, the printer portion 192, a memory 194, a hard disk 195 or the computers 330, 340 upon an instruction from the operation portion 190 or the computers 330, 340. The device controller 193 controls the scanner portion 191 to store the image data scanned in the memory 194 or hard disk 195, output it to the computer 330 or 340, or print it in the printer portion 192, for example, to effect the data processing, including the image processing.

The multi-function device 100 not only can copy an original image simply, but also process the original image through various image processings and copy it. The multi-function device 100 can perform an inversion process for inverting an original from black to white or from white to black, a trimming process for copying a part of the original, and a reduction layout process for reducing a plurality of originals to be synthesized on one sheet of output paper, for example.

Besides copying the original, the multi-function device 100 can forward the image data scanned by the scanner portion 191 via a LAN 10 (network) to the computer 330 or 340, or conversely enables the printer portion 192 to print a text created on the computer. Also, the multi-function device 100 has a facsimile transmission and reception function to transmit an original image to a facsimile device installed at the remote site or receive the image data therefrom.

This can be implemented using a computer hardware function, not shown, contained within the device controller 193, or by virtue of a driver software and a control software stored in a file server 300.

In FIG. 1, the file server 300 has a storage device 300a such as a hard disk for storing a system program (application, job control program, device driver program, device firmware) for the multi-function device 100, as will be described later.

A retrieval server 310 stores the storage destination information of a program file stored in the file server 300. Also, this retrieval server 310 registers the function items and the device names realizable with the multi-function device 100 or a second multi-function device 410 connected to the LAN 10.

A device management server 320 performs the management of each device connected via the LAN network, the user management, and the data management including the billing information. Also, the device management server 320 manages the device information, including the service time (or stand-by time), lifetime and warm-up time for the device capable of clustering.

The host computer 330 is connected to the LAN 10 as a terminal unit to gain access to the information supplied from a Web server 501 via the Internet 500 as will be described later, and output the image data to the multi-function device 100 or a printer 400. This computer 330 is principally used for the manager who manages an entire network, and enables the system program to be registered in the file server 300.

The host computer 340 may be also a user computer connected to the LAN 10 as a terminal unit to print out a created file using the multi-function device 100 or input the image data using the scanner portion 191. This computer 340 is generally employed principally for the user, in which several to several tens computers are usually connected to the network to allow the multi-function device 100 to be used by plural persons.

The printer 400 can print the image data from the computers 330, 340 and the file server 300 on the recording medium. The second multi-function device 410 has the same functions as the multi-function device 100, and is also connected on the LAN 10.

In this embodiment, the multi-function device not only can make the print or copy operation singly, but also the clustering can be effected to handle a plurality of devices as one high speed device. For example, if a cluster system is composed of two devices capable of 50 sheets/minute, the performance of the cluster system corresponds to 100 sheets/minute.

The communication network 500 is the Internet or the like. The Web server 501 provides a specific service to the Internet user connected on the Internet. A service provider 502 effects the connection between a personal user's terminal and the Internet 500. A fire wall 503 connects the inside of the LAN network (LAN 10) and an external communication network (Internet) to make the security management.

The configuration (LAN system) under the fire wall 503 in FIG. 1 may reside in the personal user connected to the Internet 500 via the service provider 502.

Referring now to FIGS. 2 to 5, the operation of the information processing system with the configuration of FIG. 1 will be described below. In the following, a transfer operation of a system program between the file server 300 and the multi-function device 100, 410 will be described below.

Figure 2:
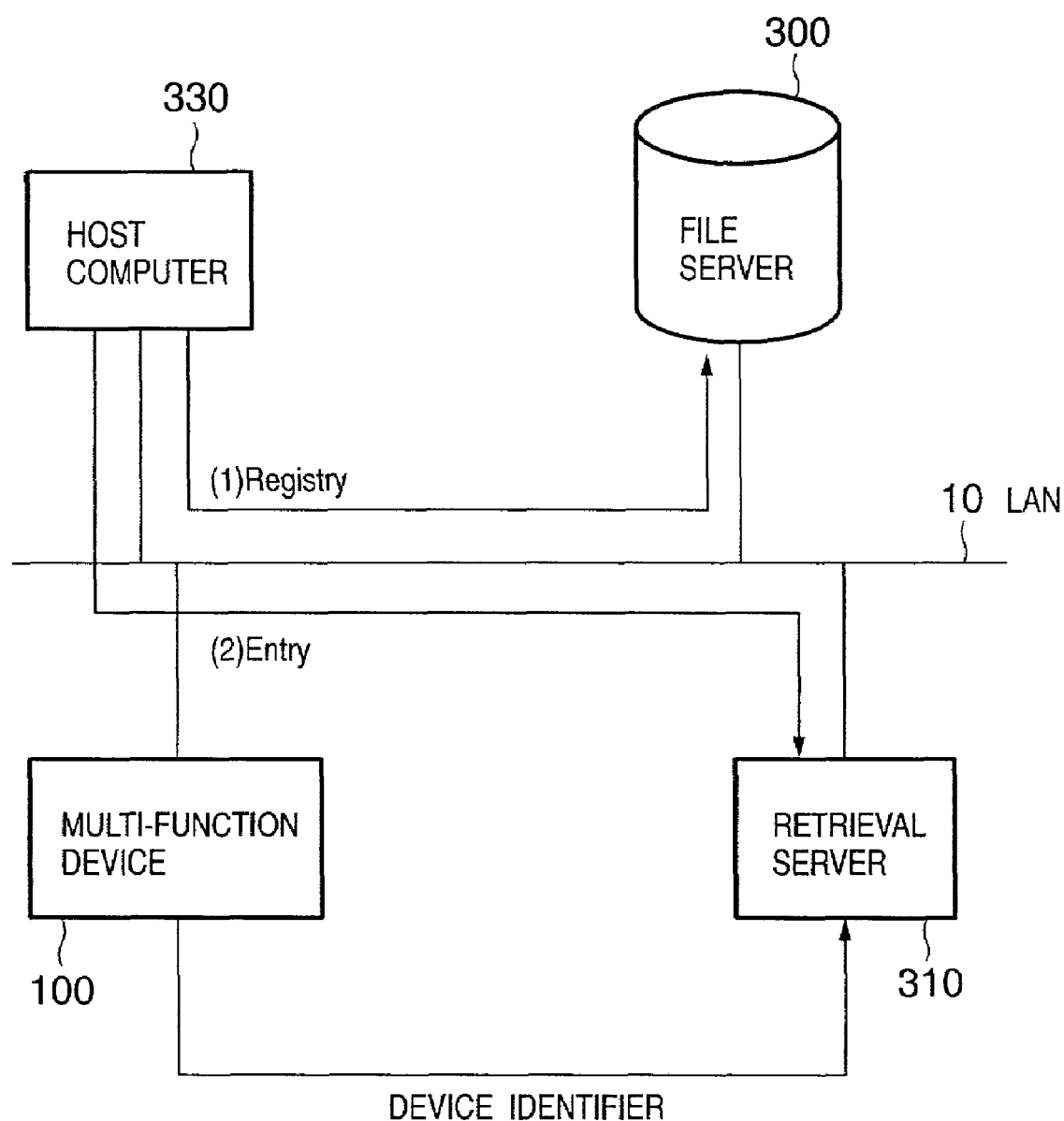
FIG. 2 is a block diagram for explaining a network operation for registering a program executable on a multi-function device in a file server connected on a network in this embodiment.

FIG. 2 is a block diagram for explaining the operation of a network device in registering a program executable on the multi-function device 100, 410 in the file server 300 connected on the network in this embodiment.

The multi-function device 100 is connected to the local area network (LAN) 10 via a LAN interface such as 10 BaseT having RJ45, for example. A plurality of host computers including the host computer 330 and a plurality of servers including the file server 300 for managing the access to a file stored in the storage device such as a hard disk are also connected to the LAN 10 to enable communication with the multi-function device 100.

If a program file executable on the multi-function device 100 is created, the host computer 330 transfers the created program file via the LAN 10 to the file server 300 (Registry (1) in FIG. 2). The program file created in the host computer 330 preferably conforms to the Internet application language such as the HTML or Java.

The file server 300 stores a program file transmitted from the host computer 330 in the storage device 300a. Further, the host computer 330 notifies the retrieval server 310 of the storage destination information of the program file transferred to the file server 300. Preferably, the storage destination of program is described in a URL format used in the HTTP protocol. For example, the address of the file server 300 is "www.pipit.canon.co.jp", the path indicating the storage location of the program file within the storage device of the file server 300 is "pmfp/japan/", and the program file name is "index.html". In this case, "www.pipit.canon.co.jp/pmfp/japan/index.html" is stored in the retrieval server 310 as the storage destination information of program file (Entry (2) in FIG. 2).

The path indicating the storage location among the storage destination information of program file ("pmfp/japan/" in the above example) also serves as an identifier of the multi-function device which can execute the program file stored therein. The retrieval server 310 stores the storage destination information of program file notified from the host computer 330 efficiently, and operates to respond to an inquiry for the program file storage destination from the multi-function device 100.

Figure 3:
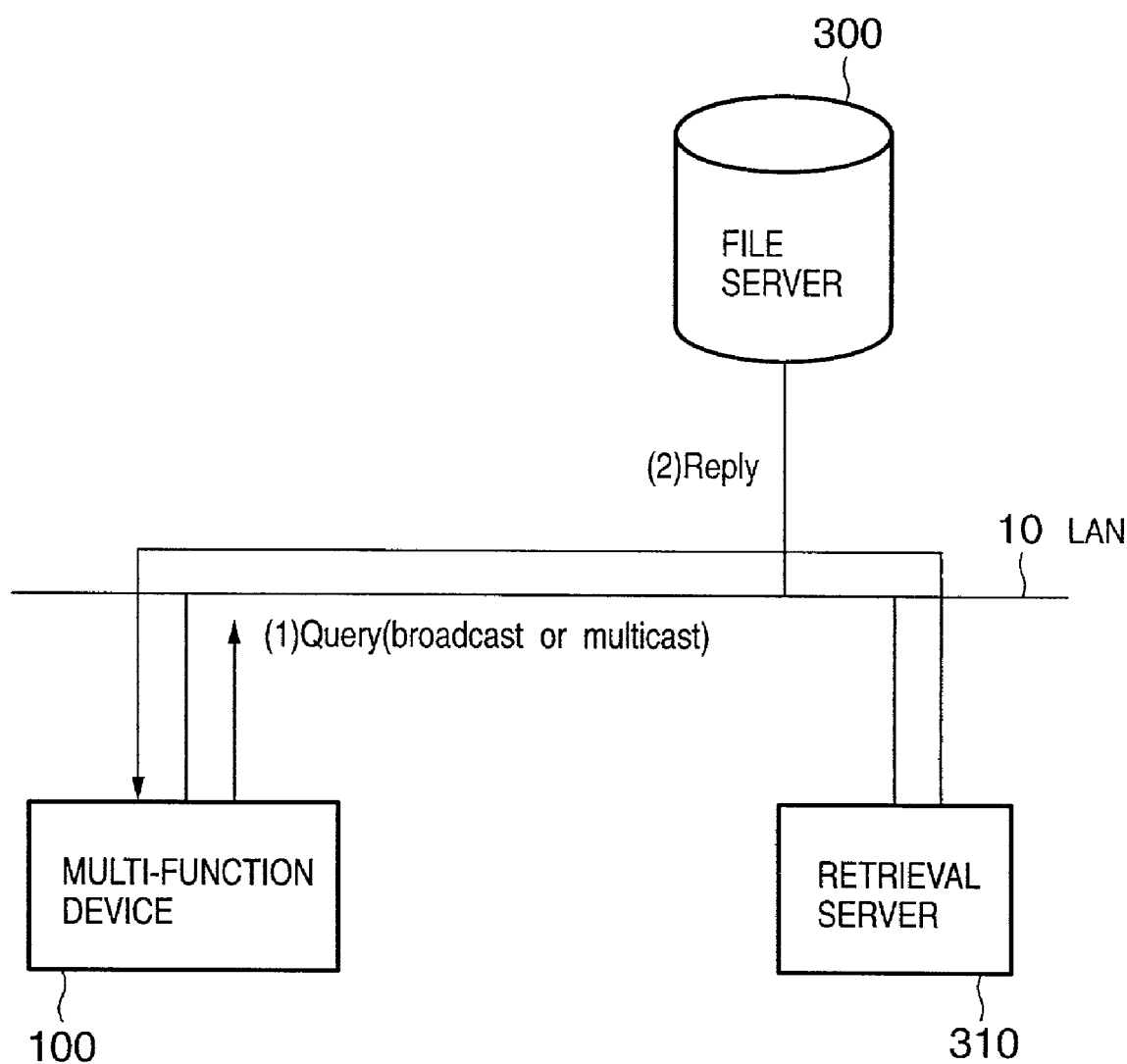
FIG. 3 is a block diagram showing a network configuration in which the multi-function device retrieves a program file stored in a recording device of the file server connected on the network in this embodiment.

FIG. 3 is a block diagram showing an example of the operation of each device in the case where the multi-function device 100 retrieves a program file stored in the storage device 300a of the file server 300 connected on the network 10.

The multi-function device 100 sends out a packet for making an inquiry for the storage destination of program file on the local area network (LAN) 10, upon detecting that the storage destination of the program file executable on the multi-function device 100 is unknown at the time of turning on the power or in an initialization state (Query (1)). This packet contains a device identifier of transmission source, and is sent out as a packet of undesignated destination with a broadcast or multicast method.

The retrieval server 310 connected on the network receives the packet sent out from the multi-function device 100, makes an inquiry for the storage destination of program file that is requested by the multi-function device 100 on the basis of the device identifier of transmission source contained in the packet and the storage destination information of program file stored in the retrieval server 310 as shown in FIG. 2, and notifies its result to the multi-function device 100 via the LAN 10 (Reply (2)).

For example, the multi-function device 100 transmits a packet containing Device Type: pmfp, Country: Japan as the device identifier to the LAN 10. The retrieval server 310 retrieves a program file stored at a storage location coincident with pmfp and Japan as the device identifier, in which if there is a program file matched with the device identifier, the storage destination information of the program file, or the address (URL) data is transmitted to the multi-function device 100.

Figure 4:
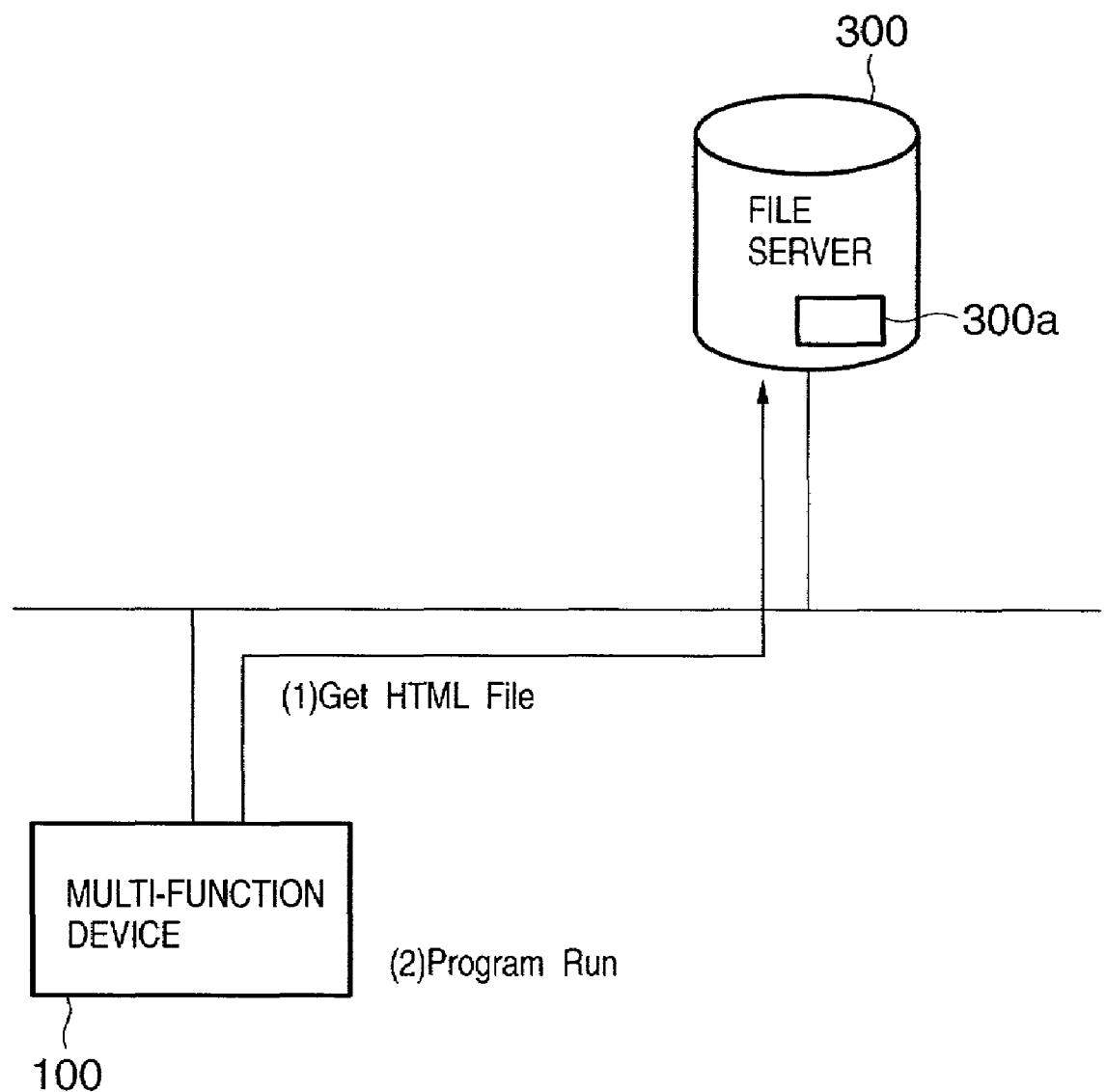
FIG. 4 is a block diagram showing a network configuration for acquiring and executing a program executable on the multi-function device from the file server connected on the network in this embodiment.

FIG. 4 is a block diagram showing an example of the operation of the file server 300 and the multi-function device 100 in the case where the multi-function device 100 acquires and executes an executable program from the file server 300 connected on the network.

The storage device 300a of the file server 300 stores a program file executable by the multi-function device 100. The multi-function device 100 acquires the storage destination information of program file in accordance with a procedure as shown in FIG. 3, or an operation from the operation panel (not shown) already connected to the multi-function device 100, and sends out a request packet of making an acquisition request for the program file to the file server 300 on the basis of the program file storage destination information (Get HTML File (1) in FIG. 4).

For example, the multi-function device 100 instructs the address of the file server 300 and the storage destination of program file within the storage device by describing the address "http://www.pipit.canon.co.jp/pmfp/_japan/index.html" within a request packet "Get HTML File". The file server 300 reads the program file (index.html in the example) from the storage device 300a in accordance with the contents of the acquired request packet received from the multi-function device 100 and transmits it to the multi-function device 100.

The multi-function device 100 translates and executes the program file transferred from the file server 300 with the CPU within the multi-function device 100 and a program file interpreter stored in the ROM (Program Run (2)).

Figure 5:
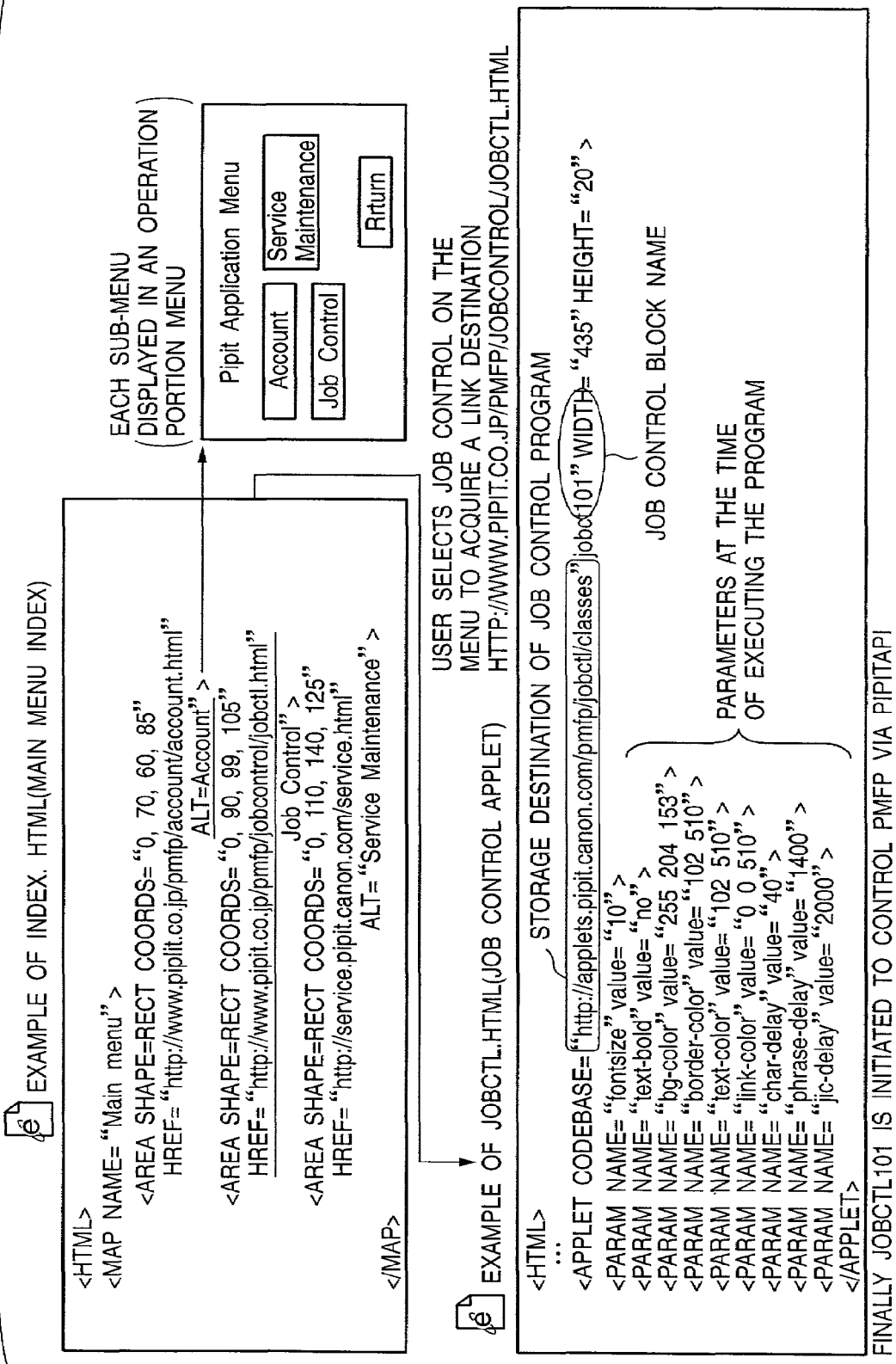
FIG. 5 is a description example of a program file acquired from the file server in an HTML format in this embodiment.

The program file acquired from the file server 300 is preferably described in an HTML format as shown in FIG. 5. In an example of FIG. 5, the acquired program file (Index.html) is a program for controlling a menu displayed on the operation portion to display "Account", "job Control" and "Service Maintenance" on the screen of the multi-function device 100.

Also, the program file can be associated (linked) with other program file, whereby if the storage destination information of a sub-program is described in the program file, the program can be acquired in accordance with the storage destination information when the sub-program is needed.

The detailed configuration of the multi-function device 100 for performing the above operation will be described below.

Figure 6:
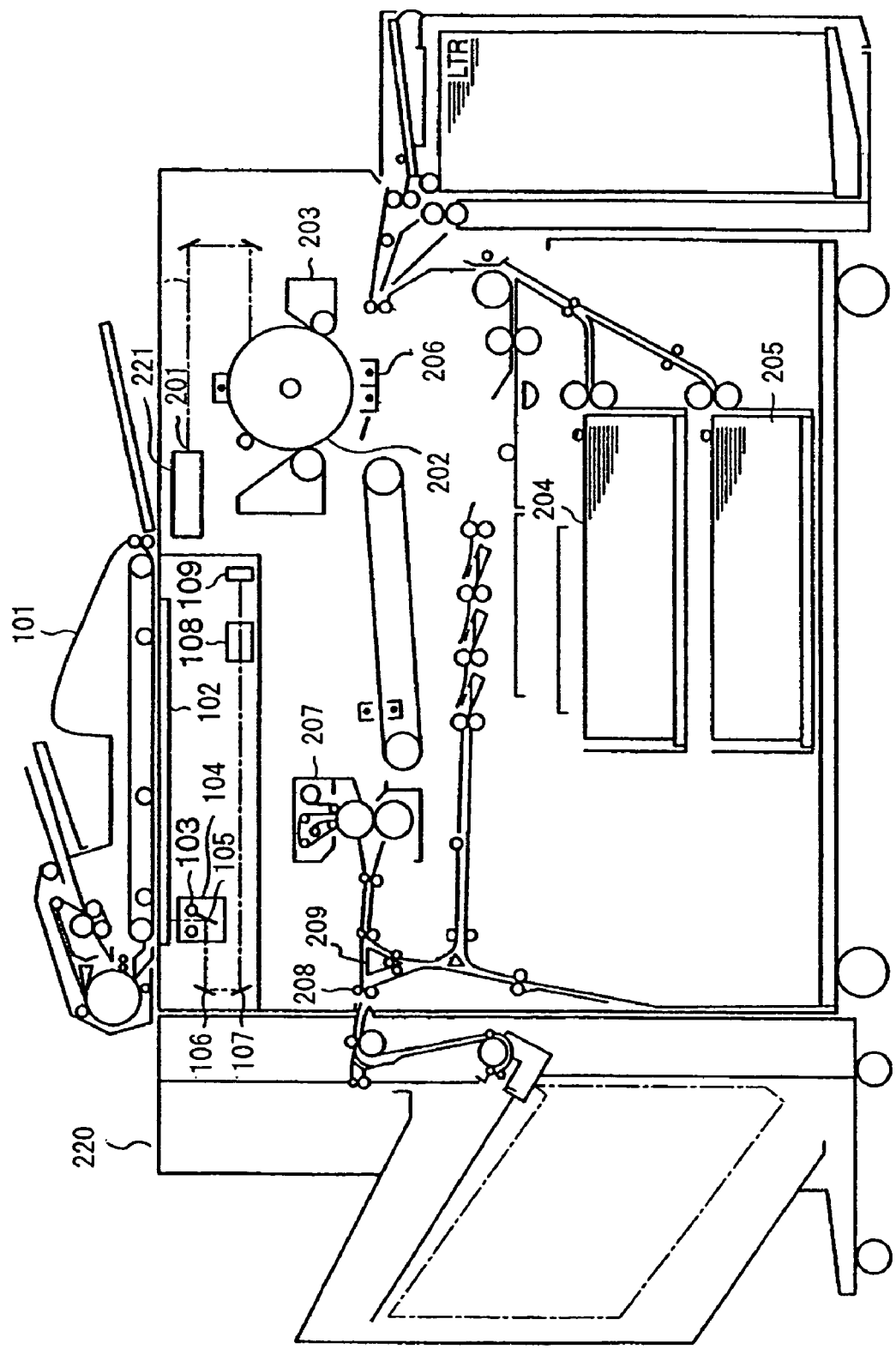
FIG. 6 is a cross-sectional view of the multi-function device in this embodiment.

FIG. 6 is a cross-sectional view of the multi-function device 100 in this embodiment, comprising the scanner portion 191 and the printer portion 192.

An original feed unit 101 of the scanner portion 191 feeds one original after another from the last page onto a platen glass 102, and ejects the original on the platen glass 102 after the reading operation of the original. If the original is conveyed onto the platen glass 102, a lamp 103 is lighted.

And the movement of a scanner unit 104 is started to scan the original by exposure to light. A reflected light from the original at this time is led via the mirrors 105, 106 and 107 and a lens 108 to a CCD image sensor (hereinafter referred to as a CCD) 109. An image of the original obtained by scanning in this way is read by the CCD 109.

The image data output from the CCD 109 is subjected to a predetermined processing, and transferred to the printer portion 192. A laser driver 221 of the printer portion 192 drives a laser emitting portion 201 to emit a laser light corresponding to the image data output from the scanner portion 191.

This laser light is applied onto a photosensitive drum 202, a latent image corresponding to the laser light being formed on the photosensitive drum 202. A developer is attached onto a part of the latent image on the photosensitive drum 202 by a developing unit 203. And a recording sheet is supplied from either of the cassettes 204 and 205 and carried to a transfer portion 206 at a timing synchronized with the start of applying the laser light, the developer attached onto the photosensitive drum 202 being transferred onto the recording sheet.

The recording sheet with the developer is carried to a fixing portion 207, and the developer is fixed onto the recording sheet owing to heat and pressure of the fixing portion 207. The recording sheet passed through the fixing portion 207 is exhausted by an exhausting roller 208, and a sorter 220 accommodates the exhausted recording sheet within a respective pin for sorting the recording sheet.

If the sorting is not set, the sorter 220 receives the recording sheet within an uppermost pin. If the both side recording is set, the recording sheet is carried to the exhausting roller 208, and then led to a conveyance path for feeding back the sheet, employing a flapper 209, by reversing the rotational direction of the exhausting roller 208. If the multiple recording is set, the recording sheet is led to the conveyance path for feeding back the sheet by the flapper 209 so that it may not be carried to the exhausting roller 208. The recording sheet led to the conveyance path for feeding back the sheet is supplied to the transfer portion 206 at the timing as above mentioned.

Figure 7:
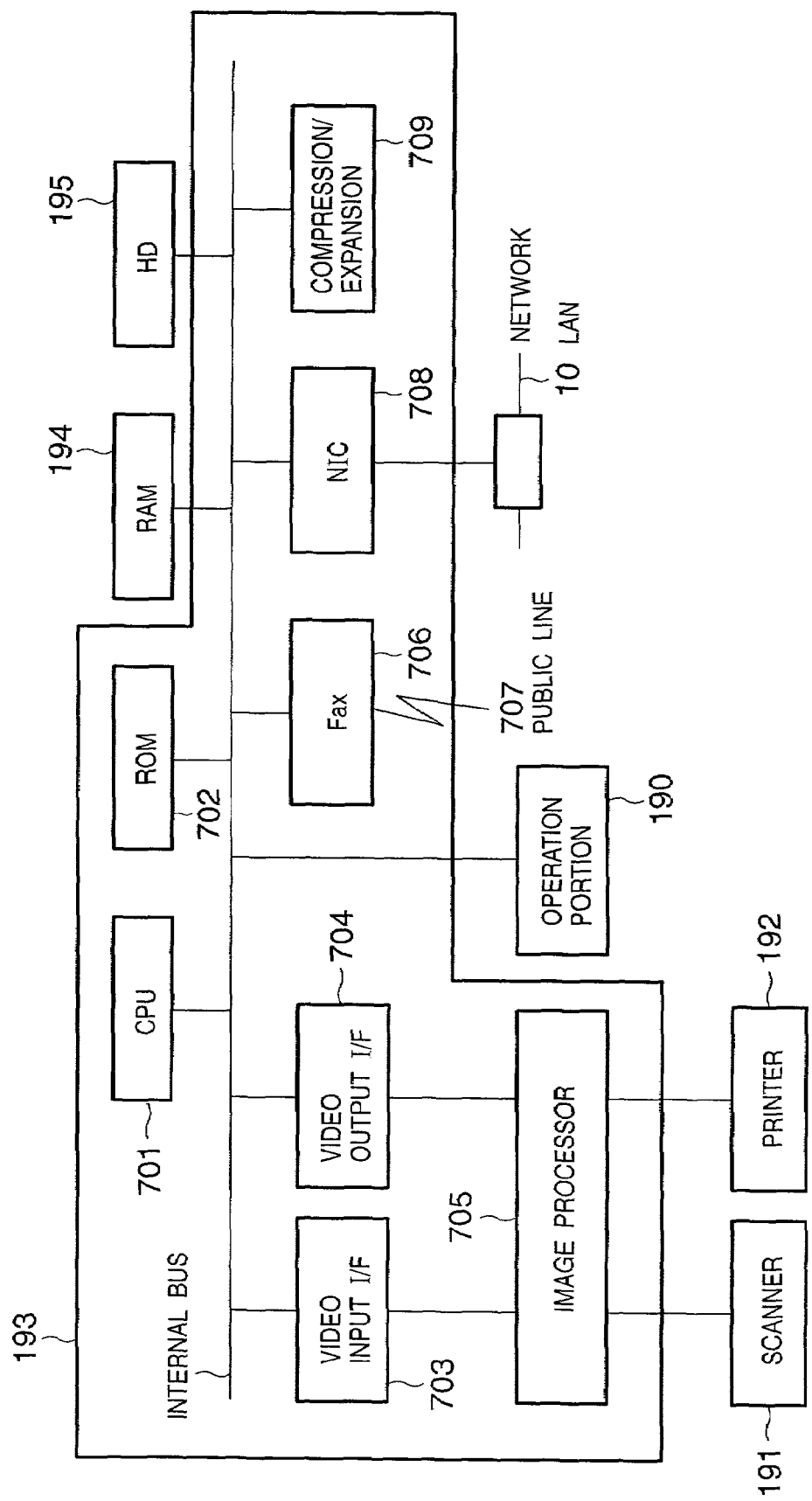
FIG. 7 is a detailed block diagram showing a hardware configuration of the multi-function device in this embodiment.

FIG. 7 is a block diagram showing an internal configuration of the multi-function device 100 in this embodiment, and particularly a configuration of a device controller 193.

A CPU 701 executes a program stored in a ROM 702 or a program read into a RAM 194 in the manner as described previously to control the whole device. A hard disk (HD) 195 stores a program file or a data file downloaded from the file server.

A video input I/F board 703 and a video output I/F board 704 are connected to an image processing unit 705 and an internal bus. The image processing unit 705 is connected to the scanner 191 and the printer 192. The image data input from the scanner 191 is processed by the image processing unit 705, and input via the video input I/F board 703 into the internal bus. Also, the data entered from the internal bus via the video output I/F board 704 into the image processing unit 705 is processed, as needed, and output to the printer portion 192.

The operation portion 190 has a touch panel for enabling the user to operate or a display portion.

A facsimile board 706 transmits or receives an image via the public line 707.

A network interface card (NIC) 708 makes the communication control with the computers 330, 340 or the file server 300 connected via the network (LAN 10).

An image compression/expansion portion 709 makes an image compression processing for reducing the data amount or an image expansion processing for expanding the compressed data in storing the image data in the memory 194 or the hard disk 195.

These function boards are connected with each other via the internal bus, and the CPU 701 performs the transfer or reception of the image data and the control for each function board.

The program or the image data downloaded via the internal bus is transferred in time division.

Figure 8:
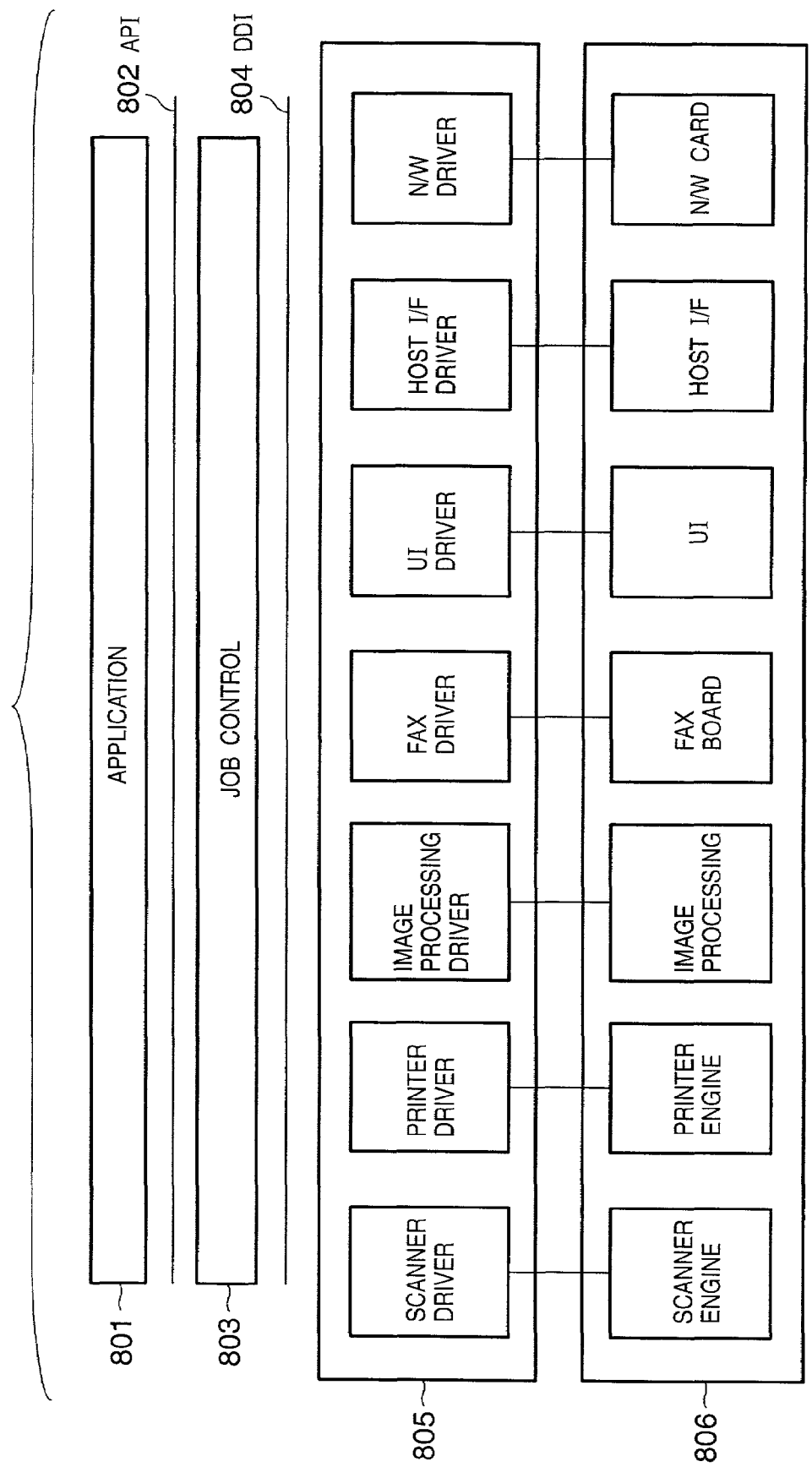
FIG. 8 is a block diagram for explaining a control software structure of the multi-function device in this embodiment.

FIG. 8 is a block diagram for explaining a software structure of a control program executed by the multi-function device 100 with the configuration of FIG. 7. These programs are executed by the CPU 701 of FIG. 7.

In FIG. 8, an application program 801 is a group of application programs for implementing the functions of copy, facsimile, scan and print in the multi-function device 100.

An application program interface (API) 802 is an interface between the application program 801 and a job control program 803.

The job control program 803 controls the jobs of copy, facsimile, scan and print. A device driver interface 804 is an interface (hereinafter referred to as DDI) between the job control and the device driver.

A device driver program 805 controls the devices with which the multi-function device is equipped. A device group 806 is controlled by the device driver program.

In FIG. 8, a scanner driver controls the scanner; a printer driver controls the printer; an image processing driver controls the image processing; a facsimile driver controls the facsimile board; a UI driver controls a UI (operation portion); and an N/W driver controls an N/W card. These system programs are able to implement various sorts of functions by being downloaded by the multi-function device 100, as the file server needs.

With the above configuration, the application program 801 enables the job control program 803 to be executed in accordance with an application via the API 802. For example, an application program for copy performs various processings on the application, including the selection of paper cassette, and enables a copy job control program to be executed via the API 802. The copy job control program performs the operation of the scanner driver in accordance with predetermined parameters to read an original, performs the operation of the image processing driver, as needed, and performs the operation of the printer driver to output the image.

In this way, the multi-function device 100 provides various kinds of functions.

Figure 9:
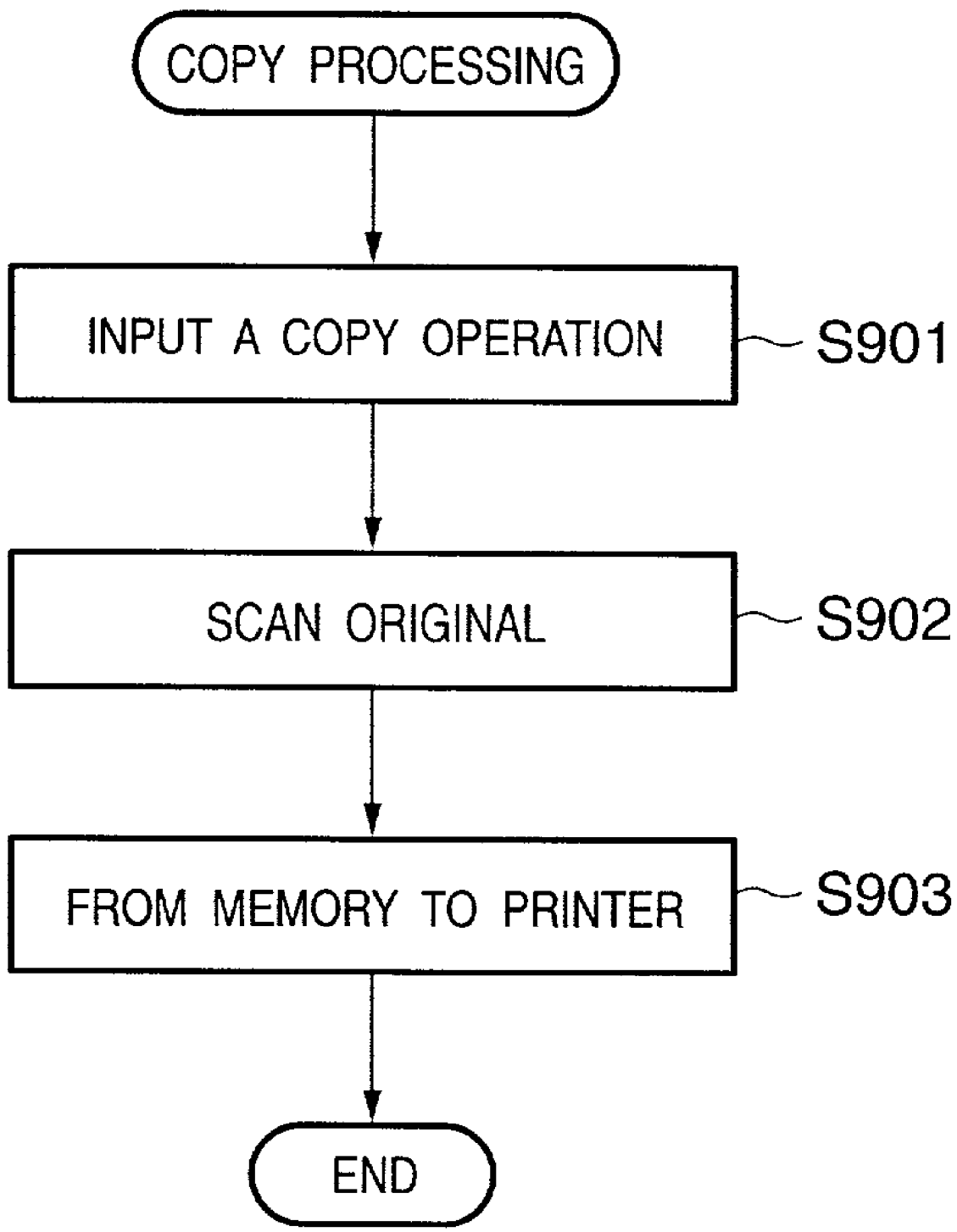
FIG. 9 is a flowchart for explaining a copy process of the multi-function device in this embodiment.

FIG. 9 is a flowchart for explaining a copy process with the multi-function device 100. It is supposed in the following that a system program needed for the copy function has been downloaded into the multi-function device.

At step S901, a copy operation instruction is input from the operation portion 190. Then, the operation proceeds to step S902, whereby an original is scanned by the scanner portion 191 to generate an electrical signal, which is then converted into the digital data, the digital image data corresponding to the original image being obtained. The converted digital data is subjected to a predetermined image processing in the image processing portion 705 and stored via the video input I/F 703 in the memory 194.

Subsequently, at step S903, the image data stored in the memory 194 is sent via the video output I/F 704 and the image processing portion 705 to the printer 192. And it is printed in synchronism with the print speed by the printer portion 192.

Also, in order to normally perform the copy operation or facsimile operation of the copy portion and the image data transfer to the network, the compression and expansion of image is made to write the compressed image data in the hard disk 195 that is a large capacity memory or read the image data from the hard disk. In the case of facsimile transmission, the image compression is normally performed.

Figure 10:
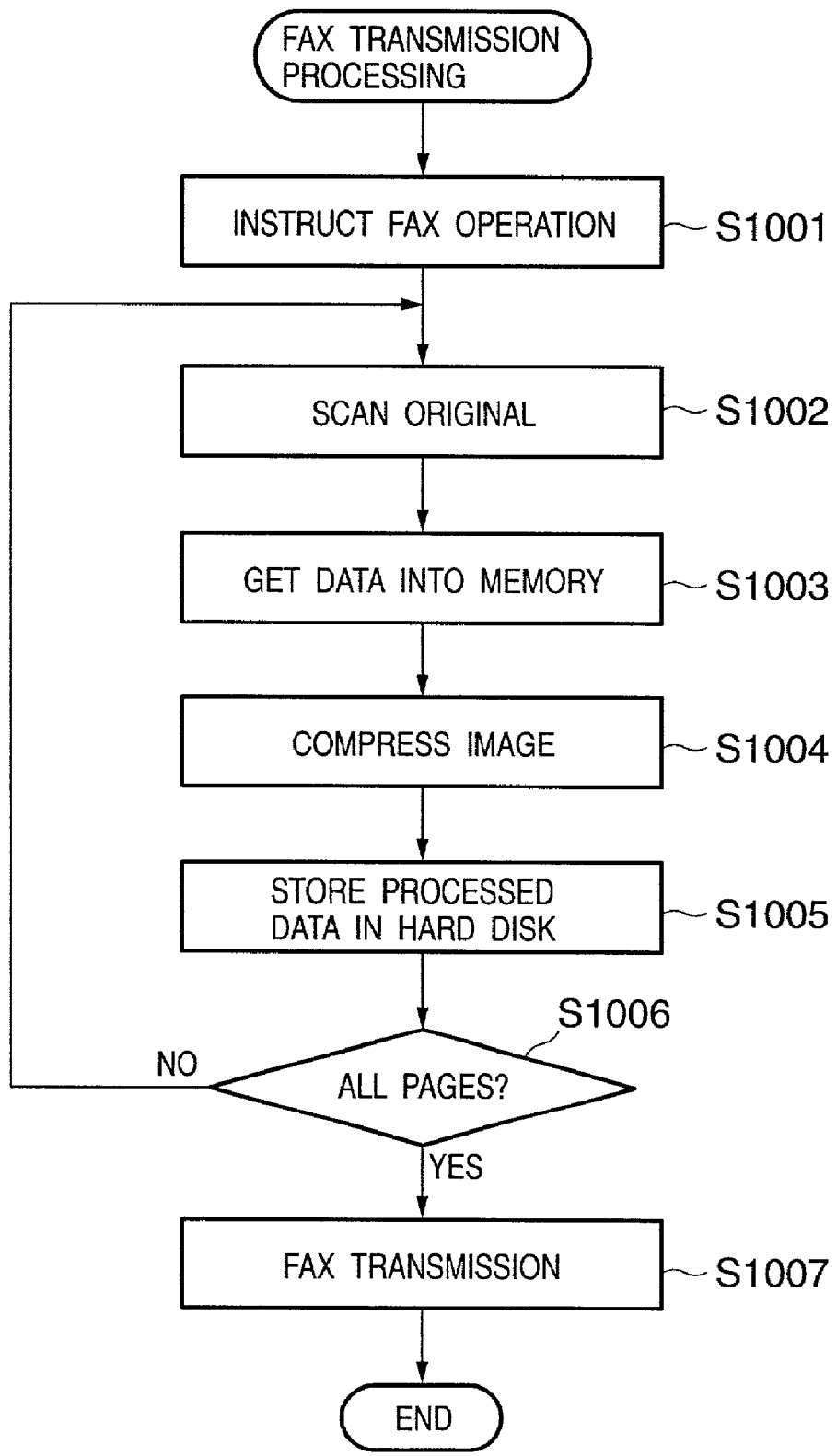
FIG. 10 is a flowchart for explaining a scan process in a facsimile transmission process in this embodiment.
Figure 11:
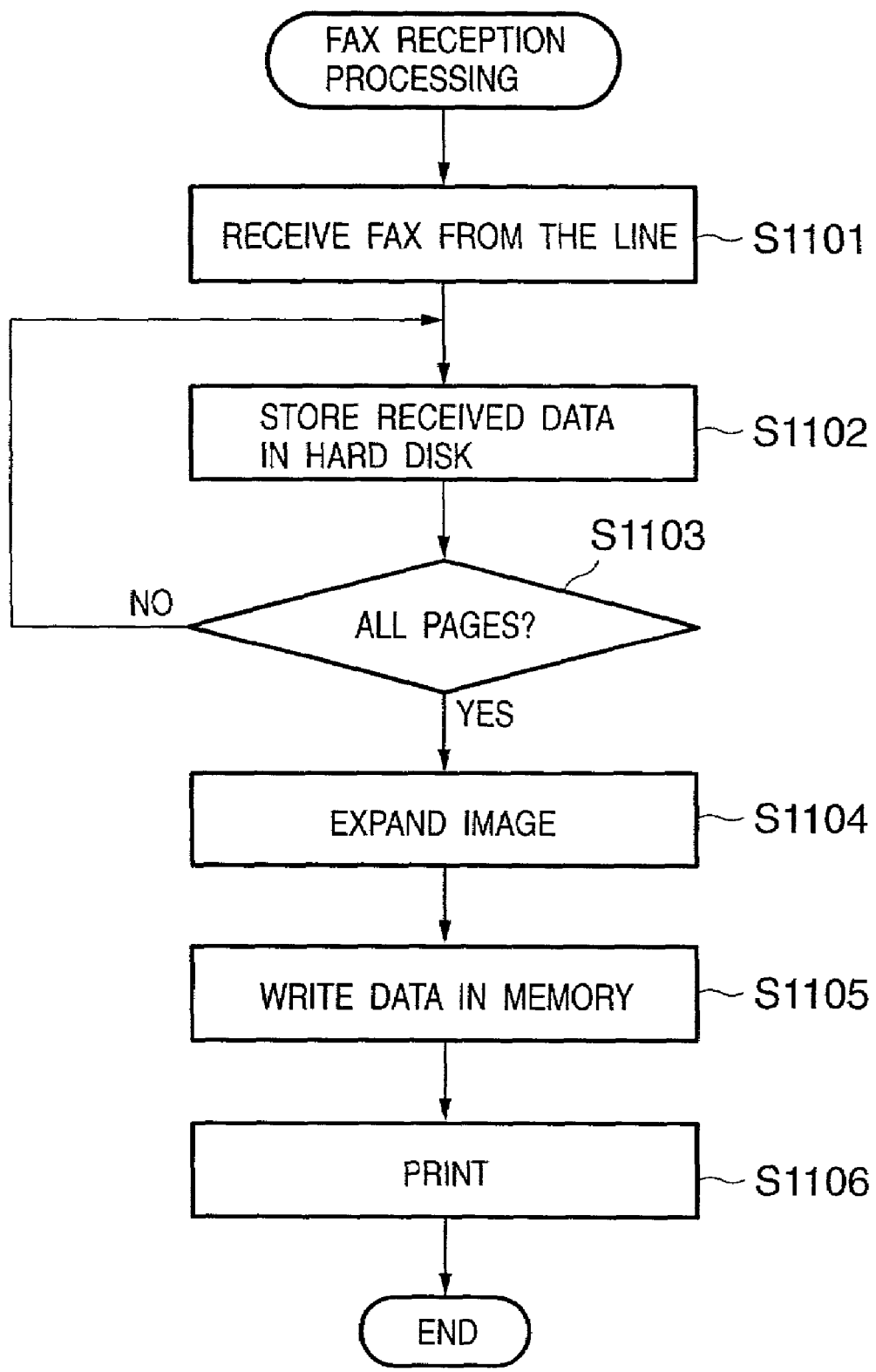
FIG. 11 is a flowchart for explaining a facsimile reception process in this embodiment.

Referring now to FIGS. 10 and 11, the transmission and reception of facsimile information in this embodiment will be described below. FIG. 10 is a flowchart for explaining a facsimile transmission process in this embodiment, and FIG. 11 is a flowchart for explaining a facsimile reception process in this embodiment.

First of all, the facsimile transmission process in memory transmission will be described in connection with FIG. 10.

At step S1001, a facsimile transmission instruction is issued from the operation portion 190. Then, the procedure goes to step S1002, whereby an original scanning operation is started by the scanner portion 191 to scan an original, and obtain the digital image data corresponding to an original image. Subsequently, at step S1003, the image data is stored via the image processor 705 and the video input I/F 703 in the memory 194.

The data stored in the memory 194 is read into the compression/expansion circuit 709 at step S1004 to compress or expand the image data, as needed. And at step S1005, the processed data is accumulated in the hard disk 195. Then at step S1006, it is checked whether or not all the pages of originals are scanned and stored in the hard disk 195. If there remains any original to be scanned, the procedure returns to step S1002 to scan the next page of original.

On one hand, if it is determined at step S1006 that all the pages of originals are scanned and accumulated in the hard disk 195, the original scan operation is ended and the procedure transfers to step S1007. And the image data stored in the hard disk 195 is read successively, a desired transmission destination is called via the facsimile board 706 and the public line 707, and the facsimile transmission is performed if the called party responds.

In the facsimile transmission, the data may be once read from the hard disk 195 into the memory 194 and transmitted, depending on the transmission rate of the data to be transmitted.

The facsimile reception process in this embodiment will be described in connection with FIG. 11.

If a call via the public line 707 and the facsimile board 706 is detected, the device responds to the call, and if the call is the facsimile communication, the operation transfers to the procedure of FIG. 11.

First of all, at step S1101, the facsimile reception data is received via the public line 707 and the facsimile board 706. The received facsimile data is stored in the hard disk 195 in succession at step S1102. In this way, the data is read, and it is checked at step S1103 whether or not the facsimile communication is ended and all the data is accumulated in the hard disk. If the facsimile communication still continues and the next reception information remains, the procedure returns to step S1101 to receive the facsimile data.

On one hand, if the facsimile communication is ended and all the facsimile data from the calling party is received at step S1103, the procedure transfers to step S1104. At step S1104, the data accumulated in the hard disk 195 is read and compressed or expanded as needed by the compression/expansion circuit 709. Generally, the received image information is expanded.

At step S1105, the expanded data, for example, is written in the memory 194. Thereafter, at step S1106, the received data has the recording resolution converted by the video output I/F 704 and the image processor 705, and is printed out by the printer portion 192.

Figure 12:
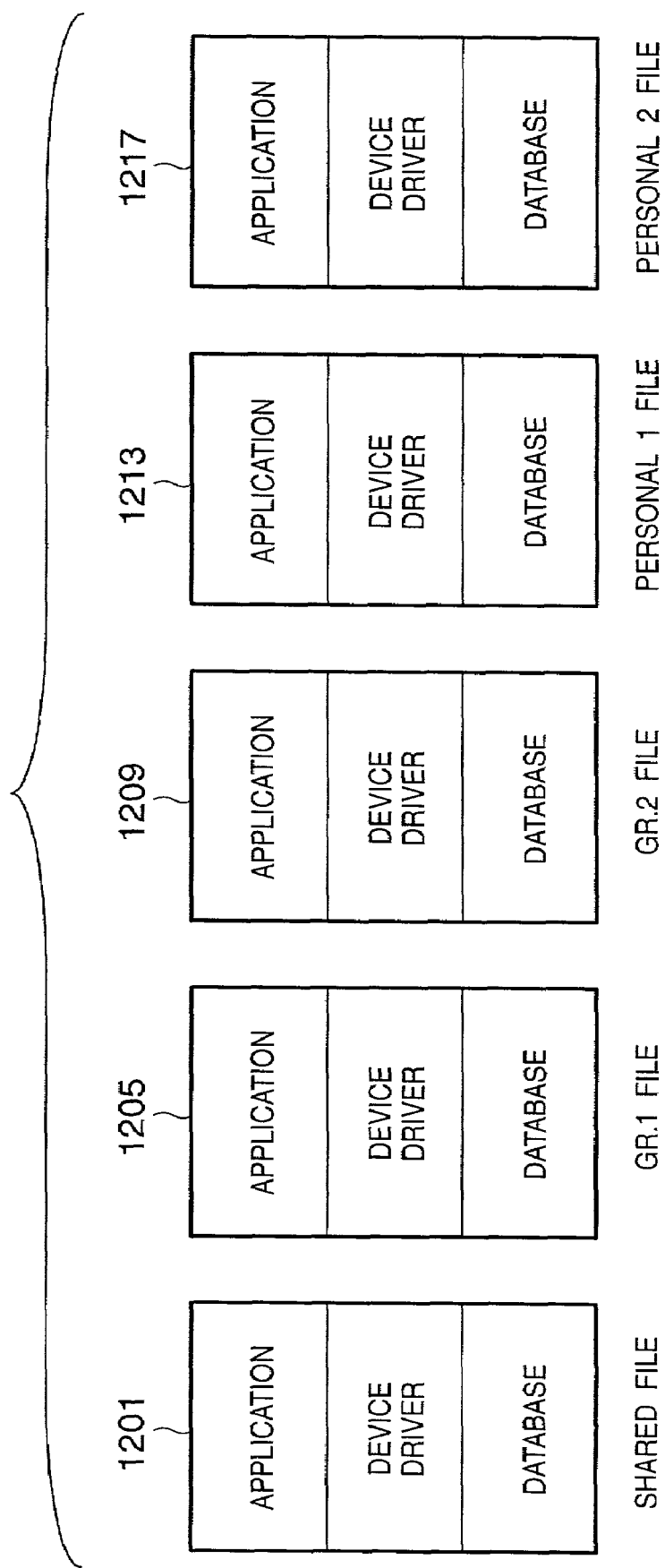
FIG. 12 is a diagram for explaining the file contents for the file server in this embodiment.

Referring to FIG. 12, the file contents stored in the file server 300 will be described below. The configuration of a file stored in the file server 300 is managed by the retrieval server 310.

In FIG. 12, a shared file 1201 contains a group of files that can be shared through the network.

The group files 1205, 1209 are group of files that can be shared within a specific group, and whether or not to use them is managed with an ID number for logging in the server 300.

The personal files 1213, 1217 are an intrinsic group of files that can be utilized by an individual, and whether or not to use them is managed with an ID number for logging in the server 300.

The shared file 1201, the group file 1205 and the personal file 1209 are made up of an application program file group, a device driver program file group, and a data base file group, respectively.

In this embodiment, since the files are managed in the above configuration, if an ID number is entered in logging in, the shared file, the group file and the personal file group that are predetermined by the ID number for log-in can be accessed.

Figure 13:
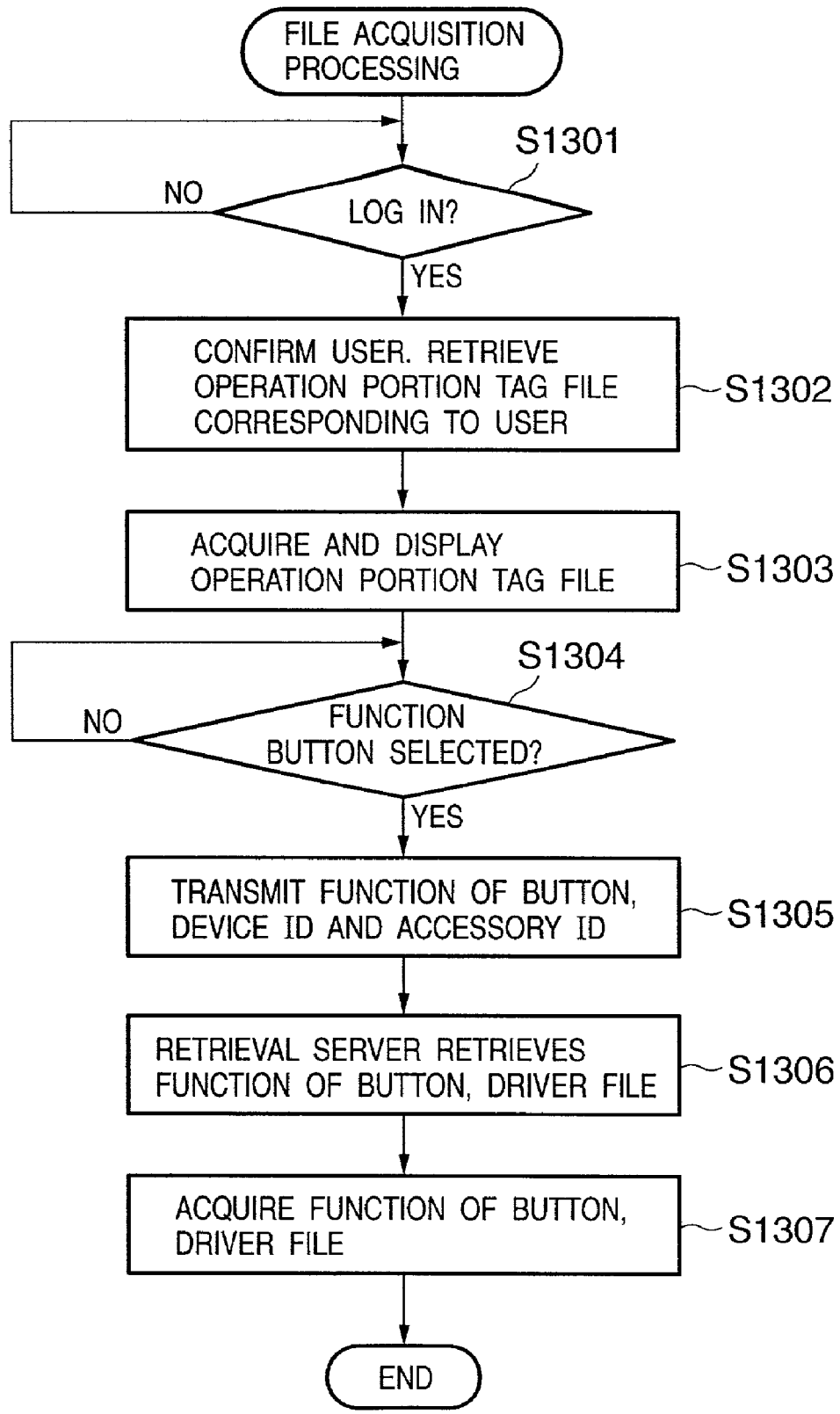
FIG. 13 is a flowchart for explaining the operation initiating the multi-function device in this embodiment.

FIG. 13 is a flowchart for explaining the operation of initiating the multi-function device in this embodiment. The multi-function device displays a screen corresponding to the user who has logged in on the operation portion, in accordance with a procedure of FIG. 13, and acquires a necessary program file upon an operation that follows.

If the power of the multi-function device 100 is turned on, the procedure transfers to step S1301 of FIG. 13, where the procedure is placed in a log-in stand-by state. At this time, the operation portion 190 is placed in an ID number input stand-by state, until an ID number is typed from a ten key on the right hand and input into the system upon pressing a START key, as shown in FIG. 14, for example.

Figure 14:
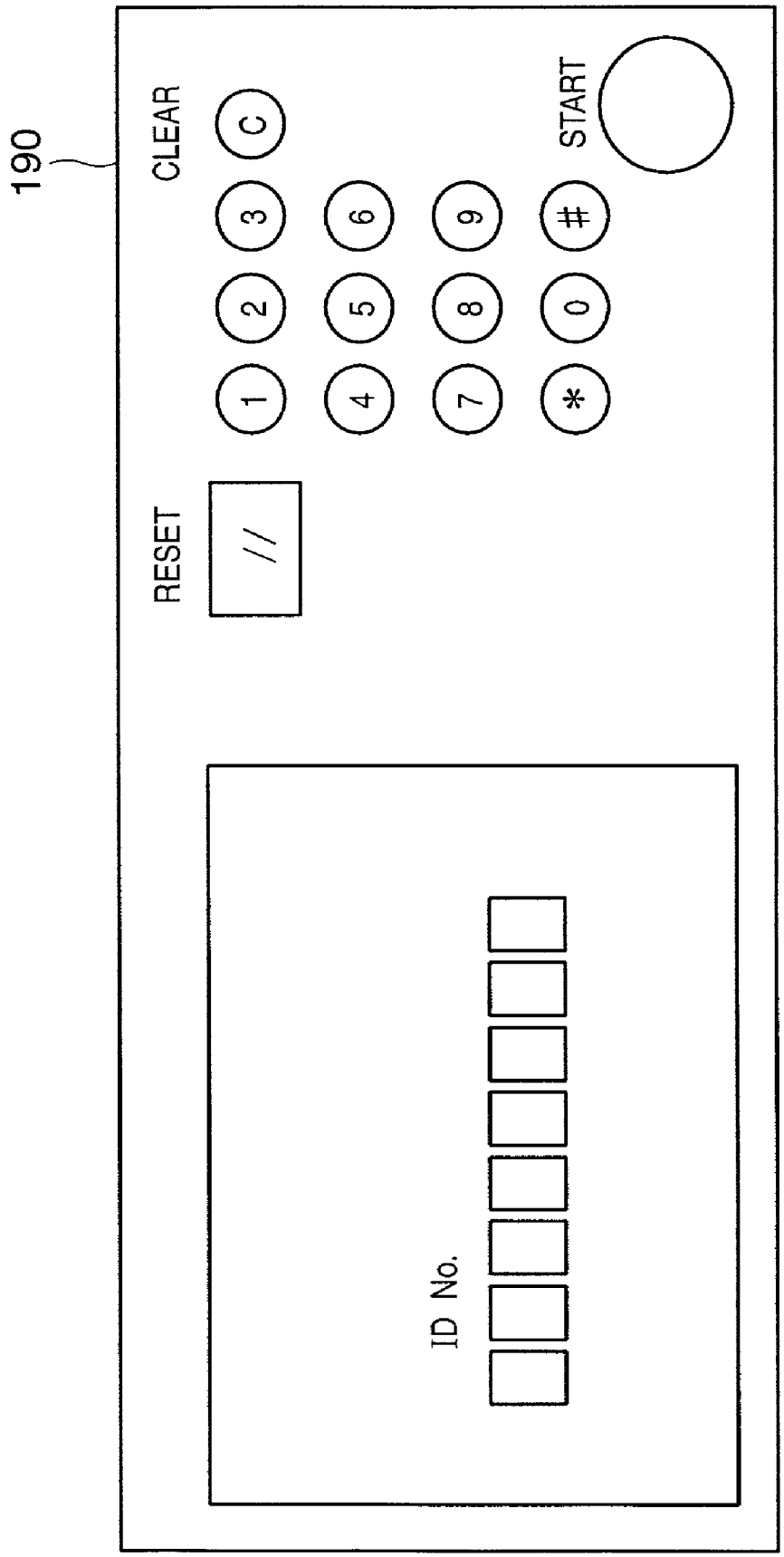
FIG. 14 is a diagram for explaining the configuration of an operation portion in this embodiment.

Herein, if an ID number (log-in ID) is entered from the operation portion 190 as shown in FIG. 14, the procedure transfers to step S1302. At step S1302, the user is confirmed with that ID number, and a packet for inquiring a program file corresponding to the ID number and the storage destination of an operation portion tag is sent out to the LAN 10.

The retrieval server 310 receives this packet, checks the ID number, and makes sure the group file and the personal file corresponding to the input ID number, retrieves the storage destination of a file usable with this ID number, and notifies the retrieval result to the multi-function device 100.

The multi-function device 100 sends out the acquired request packet of the program file to the file server 300 on the basis of the storage destination of the file received from the retrieval server 310. The file server 300 reads the program file from the storage device in accordance with the contents of the acquired request packet received from the multi-function device 100, and sends the program file to the multi-function device 100.

At step S1303, the multi-function device 100 receives the operation portion tag and the program file sent out from the file server 300, translates the program file through a program interpreter within the multi-function device 100 and executes it.

Figure 15:
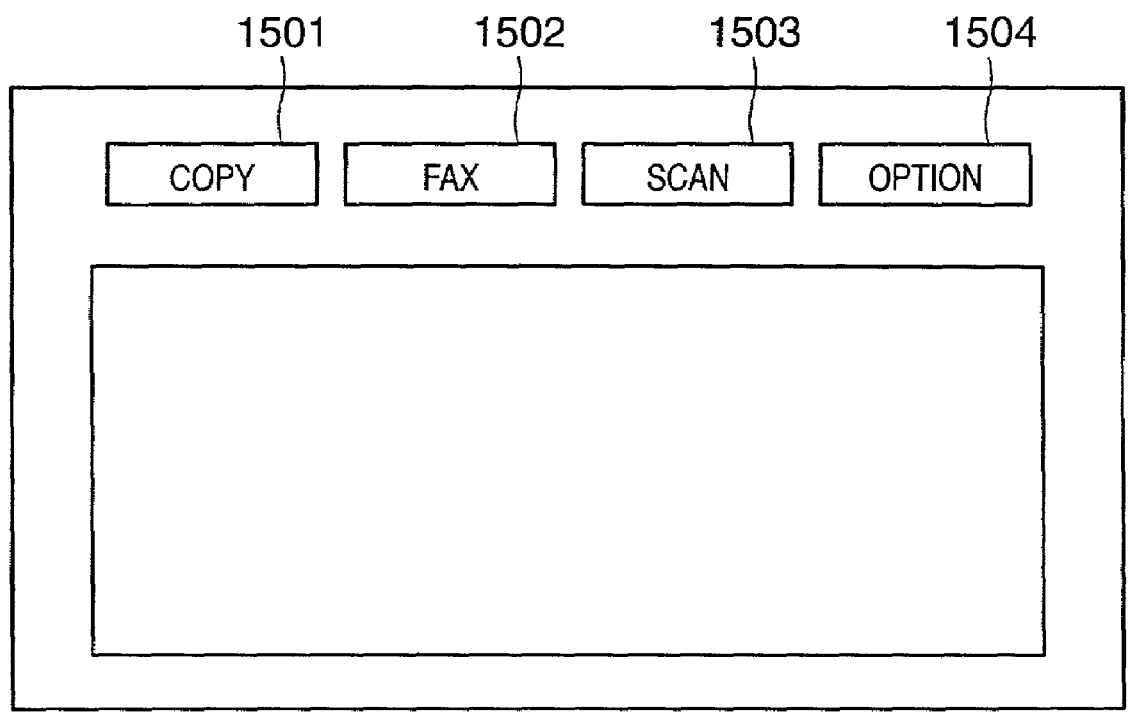
FIG. 15 is a diagram showing the details of the function buttons in the operation portion in this embodiment.

Consequently, a list of functions usable with the ID number for log-in appears on the operation portion 190 as shown in FIG. 15, for example. In FIG. 15, a copy function 1501, a facsimile function 1502, a SCAN function 1503, and an option function 1504 are displayed, whereby the user can utilize those functions.

Thereafter, at step S1304, the procedure is placed in an input stand-by state for the operation portion 190. Herein, if any of the function buttons 1501 to 1504 is pressed, the procedure transfers to step S1305.

At step S1305, the multi-function device 100 sends out a packet to the LAN 10, the packet making an inquiry for the function of pressed button, the device IDs of the scanner 191, the printer 192, the image processor 705, the facsimile board 706, the operation portion 190 which are connected to the multi-function device 100, and the storage destination of program file corresponding to the IDs of accessories including a feeder connected to the scanner portion 191 or a finisher connected to the printer portion 192.

At step S1306, the retrieval server 310 receives the inquiry sent at step S1305, and performs the processing. If this packet is received by the retrieval server 310 at step S1306, the storage destination of file usable with the multi-function device 100 is collated in accordance with the device ID or the accessory ID contained in that packet, and the collation result is notified to the multi-function device 100.

At step S1307, the multi-function device 100 sends out an acquisition request packet for program file to the file server 300, based on the storage destination information of file received. The file server 300 sends out a program file from the storage device in accordance with the contents of the acquisition request packet received from the multi-function device 100.

The multi-function device 100 receives the program file sent from the file server 300, and then translates and executes the program through the program interpreter within the multi-function device 100. In this case, a function selected by the function button is displayed on the operation portion 190.

If the copy function is selected, an operation screen is displayed regarding the copy magnification, the size of recording sheet, various image processings, or the edit processing, while if the facsimile function is selected, a screen for enabling selection of the address display or transmission mode of facsimile is displayed.

Figure 16:
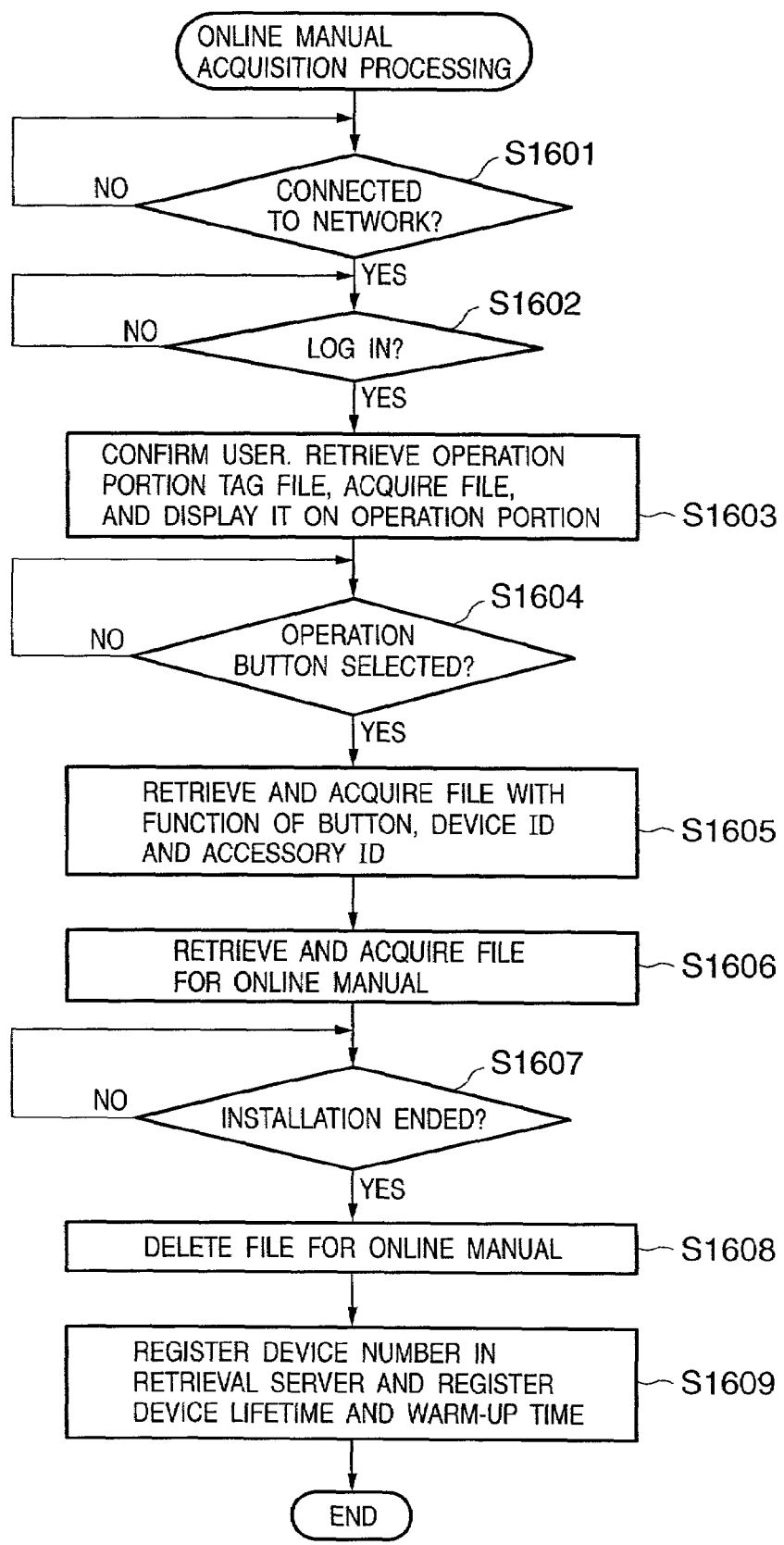
FIG. 16 is a flowchart for explaining an operation of downloading the data of an online manual and automatically deleting the data after installing it in this embodiment.

Referring now to FIG. 16, a procedure for downloading the online manual data required in installing the multi-function device from the file server 300 will be described below. FIG. 16 is a flowchart for explaining the operation of downloading the online manual data as well as the program file, and deleting automatically them after installation, when connecting the multi-function device to the network.

The multi-function device 100 is connected to the network LAN 10 and the power of the device is turned on. The procedure transfers to step S1601 of FIG. 16, and placed in a network connection stand-by state. And if the network connection is made, the procedure transfers to step S1602, and placed in a log-in stand-by state. This is an ID number stand-by state in the operation portion 190, as shown in FIG. 14. Herein, if an ID number is typed from the ten key on the right hand, and entered into the system upon pressing the START key, the procedure transfers to step S1603.

If the ID number for log-in is entered, the multi-function device 100 sends out a packet for making an inquiry for the storage destination of program file to the LAN 10 at step S1603. The retrieval server 310 receives this packet, checks the ID number, makes sure a file group and a personal file group to which the input ID number belongs, collates the storage destination of function file usable with this ID number, and notifies its result to the multi-function device 100.

The multi-function device 100 sends out a packet for making an acquisition request for the program file to the file server 300, based on the storage destination information of its file. The file server 300 sends a program file from the storage device in accordance with the contents of the acquisition request packet received from the multi-function device 100.

The multi-function device 100 receives the program file sent from the file server 300 and translates and executes the program through the program interpreter within the multi-function device 100 at step S1603. In this case, a list of functions usable with the ID number for log-in is displayed on the operation portion 190 as shown in FIG. 15, and the procedure transfers to step S1604 and is placed in an input stand-by state for the operation portion 190.

As shown in FIG. 15, reference numeral 1501 denotes a copy function, 1502 denotes a facsimile function, 1503 denotes a SCAN function, and 1504 denotes an option function.

If any of the function buttons 1501 to 1504 is pressed, the procedure transfers to step S1605. At step S1605, the multi-function device 100 sends out a packet to the LAN 10, the packet making an inquiry for the function button, the device IDs of the scanner 191, the printer 192, the image processor 705, the facsimile board 706, the operation portion 190 which are connected to the multi-function device 100, and the storage destination of program file corresponding to the IDs of accessories including a feeder connected to the scanner portion 191 or a finisher connected to the printer portion 192. If this packet is received by the retrieval server 310, the storage destination of file usable with the multi-function device 100 is collated, and the collation result is notified to the multi-function device 100.

The multi-function device 100 sends out a packet for making an acquisition request for program file to the file server 300, based on the storage destination information of file received. The file server 300 sends out a program file from the storage device in accordance with the contents of the acquisition request packet received from the multi-function device 100.

The multi-function device 100 receives a program file sent from the file server 300, and then translates and executes the program through the program interpreter within the multi-function device 100. In this case, a function selected by the function button is displayed on the operation portion 190.

For example, if the copy function is selected, an operation screen is displayed regarding the copy magnification, the size of recording sheet, various image processings, and the edit processing, while if the facsimile function is selected, a screen for enabling selection of the address display or transmission mode of facsimile is displayed. The above procedure involves a fundamental operation regarding the file retrieval and acquisition of the operation portion tab file.

Thereafter, at step S1606, to download an online manual for installing the device, a packet for retrieving the storage location is sent to the network. The retrieval server 310 receives the packet, collates the storage destination of online manual data file usable with this multi-function device 100, and notifies its result to the multi-function device 100.

The multi-function device 100 sends out a packet for making an acquisition request for the online manual data to the file server 300, based on the storage destination information of file received. The file server 300 sends out the online manual data from the storage device in accordance with the contents of the acquisition request packet received from the multi-function device 100. The multi-function device 100 receives the online manual and displays it on the operation portion 190.

The operator performs the initial settings and the confirmation of functions for the multi-function device 100 in accordance with the online manual displayed on the operation portion 190. Therefore, at step S1607, the operation waits for the completion of installation, and if all the installation procedure is ended, the procedure transfers to step S1608. The end of operation can be judged on the basis of an operator's input indicating the end of operation, for example.

At step S1608, the multi-function device 100 deletes unnecessary online manual files.

At step S1609, to inform the devices on the network that the multi-function device 100 has been installed, the device items, including a machine number of the multi-function device 100, a list of feasible functions, and whether a both side copy unit or a finisher device for balancing the output sheets is mounted are registered in the retrieval server 310. Also, the warm-up time in activating the device and the device lifetime are registered.

Similarly, at step S1609, the information required for transferring to a sleep state or returning from the sleep state (sleep condition), including the service time (or standby time), lifetime and the warm-up time of the device capable of clustering, is transmitted to a device management server 320. The device management server 320 receives the information and stores it in correspondence with the device identifier.

The program usable with a newly installed device is registered from the host computer to the file server 300 and the retrieval server 310 in the manner as described above in connection with FIG. 2.

With the above procedure, in the case where a new multi-function device is connected to the network system, the information required for the retrieval server 310 or the device management server is stored, and the multi-function device is shared as a new system resource among the network system users.

<Clustering Operation>

Figure 17:
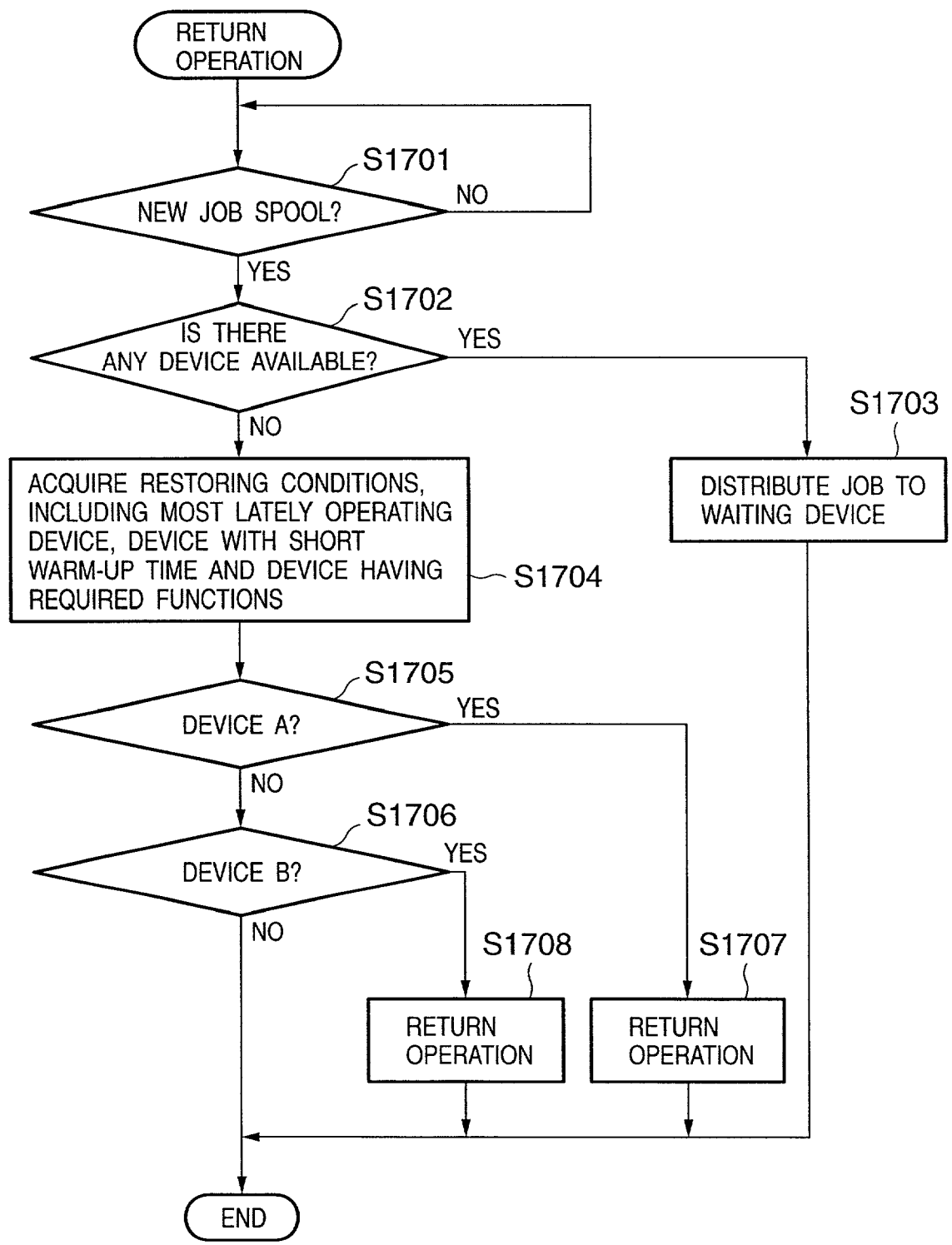
FIG. 17 is a flowchart for explaining an operation of the device for clustering to return from an energy saving operation in this embodiment.
Figure 18:
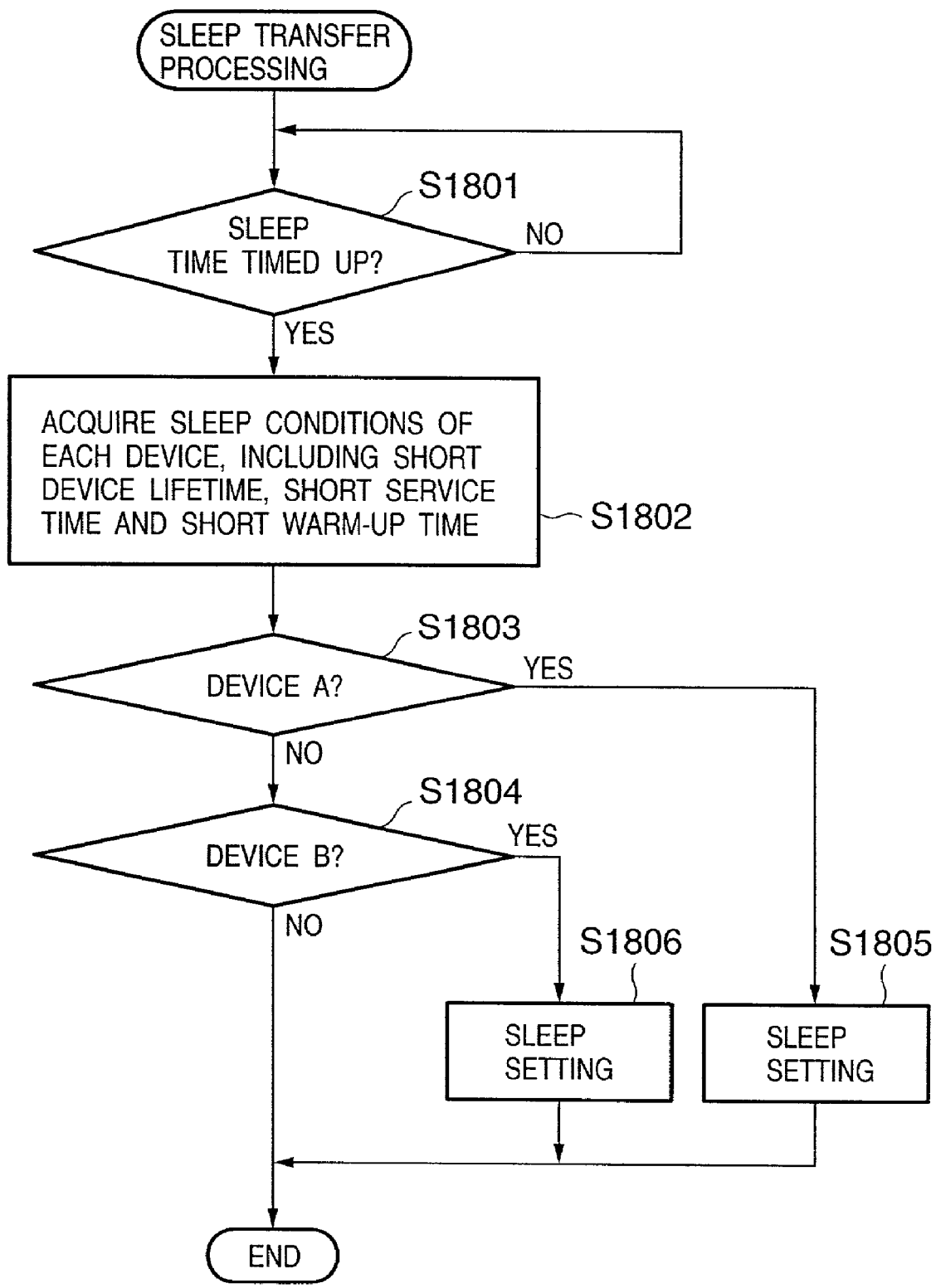
FIG. 18 is a flowchart for explaining an operation of the device for clustering to enter the energy saving operation in this embodiment.

Referring to FIGS. 17 and 18, a procedure for restoring a device for clustering from an energy saving state to a stand-by state, and a procedure for transferring a device during the clustering operation to the energy saving state will be described below.

The clustering operation involves the operation of printing the print data from the computer with a plurality of multi-function devices, the operation of printing a facsimile image received in one multi-function device with a plurality of multi-function devices, and the operation of printing a copy image read in one multi-function device with a plurality of multi-function devices.

Also, the clustering operation involves the operation of making facsimile transmission for the image data read from one multi-function device with a plurality of multi-function devices.

In such cases, one multi-function device of facsimile reception or one multi-function device that has read an original to be copied serves as a cluster system controller for controlling the system for clustering operation. In this case, the multi-function device that serves as a controller selects the multi-function device for use to output the data by referring to the device information possessed by the device management server 320, and transmits the data to the selected device to output the data. Note that a group of devices for the clustering operation is conveniently called a cluster system. That is, it can be said that the cluster system controller selects the multi-function device by referring to the device information possessed by the device management server 320 to construct a cluster system that performs the processing.

Also, a cluster system allows a plurality of multi-function devices to make facsimile transmission or printing of the image data from the computer. In this case, the device management server 320 functions as the cluster system controller. The host computer that makes facsimile transmission or printing of image data transmits a facsimile transmission or printing instruction with the image data to the device management server 320, which then selects the multi-function device for management by referring to the device information, and transmits the data for facsimile transmission or printing to the selected device to output the data.

Also, in a remote copy job in which the image scanned by a certain device is enabled to be printed by another device, the operator can select the devices constituting the cluster system upon an operation.

The procedure of FIGS. 17 and 18 is performed by the device management server 320 or the multi-function device that is the cluster system controller. The cluster system controller restores the multi-function device for cluster operation from the sleep state in accordance with the procedure of FIG. 17, and distributes a job to the multi-function device. The multi-function device during the cluster operation is transferred to the sleep state in accordance with the procedure of FIG. 18.

<Return from Sleep State (FIG. 17)>

Referring to FIG. 17, the operation of the cluster system controller in restoring the device for clustering from the energy saving state (sleep state) will be described below.

FIG. 17 is a flowchart for explaining the operation for restoring the device for clustering from the energy saving operation. The device in the sleep state is determined in accordance with a processing to be performed by the cluster system. For example, consider an instance where three multi-function devices are contained in the cluster system. In this case, for the remote copy for only one copy, it is sufficient that one multi-function device can be employed as a scanner and another one as a printer. Accordingly, the multi-function device restored from the sleep state can be determined in accordance with the job. FIG. 17 shows its procedure. The procedure of FIG. 17 is performed by the device management server 320 or the multi-function device that functions as the cluster system controller. Note that the device that is already making the cluster operation is not subjected to the procedure of FIG. 17.

In FIG. 17, first of all, at step S1701, it is determined whether or not a new job is input from the cluster system when a plurality of devices are in the sleep state.

If the new job is input, and the number of devices is insufficient, a process for restoring the device required for the clustering from the sleep state under the conditions as will be described later is performed. At step S1702, it is checked whether or not the required number of immediately operable devices or the devices in the stand-by state are available when the new job is input. If the required number of operable devices exist, the procedure proceeds to step S1703, where a job is distributed to a plurality of devices capable of clustering to perform the job, and then the procedure is ended.

On one hand, if it is determined at step S1702 that the required number of operable devices do not exist when the new job is input, the procedure proceeds to step S1704, to acquire the restoring conditions from the sleep state for each device. Specifically, the restoring conditions from the sleep state that is preset in the device management server 320 are acquired. For example, the device that has operated up to the most recent time, the device with short warm-up time, and the device with necessary functions are settable. Of course, such information is registered in the device management server 320 when each device transfers to the sleep state.

In order to restore each device from the sleep state to the operable state efficiently, a plurality of settings may be made. In a following embodiment, the return operation is entered by the device that has operated up to the most recent time and is required to have a short time taken for returning (return time).

At step S1705, it is checked whether or not the device 100 is matched with the return operation condition from the sleep state. If the device 100 is not matched with the return operation condition from the sleep state, the procedure proceeds to step S1706, where it is checked whether or not the device 410 is matched with the return operation condition from the sleep state.

If the device 410 is matched with the restoring condition from the sleep state at step S1706, the procedure proceeds to step S1708 to perform the return operation, and then the procedure is ended. In this embodiment, if it is determined that the device 410 has operated up to the most recent time among the multi-function devices making up the cluster system, the restoring condition is judged to have been met.

On the other hand, if the device 410 is not matched with the restoring condition from the sleep state at step S1706, and there is no other device connected, the return operation from the sleep state is ended.

Further, if it is determined that the device 100 is matched with the restoring condition from the sleep state at step S1705, the procedure proceeds to step S1707 to make such a setting that the device 100 may be placed in the restoring condition. For example, a spindle motor is started by issuing a command for standby state in the hard disk, the temperature adjusting operation is conducted until a fixing device in the printer portion reaches the normal temperature, or the initialization is made by turning on the power supply except for a main CPU on the control substrate within the device, after which the procedure is ended, and the device is placed in the operable state. In this way, the whole device can be placed in the stand-by state.

Also, if a plurality of devices are in the sleep state, the procedure returns to step S1702 after execution of step S1707 or step S1708. The above operation is repeated until the required number of devices are secured.

Thus, if the required number of devices are in the stand-by state, or transferring to the stand-by state, the procedure branches from step S1702 to step S1703, where a job is distributed to the device in the stand-by state or the device transferring to the stand-by state.

Also, the condition for returning from the sleep state is set so that clustering a new job may be started efficiently and in a short time. For example, in a cluster system with high processing frequency of print job having the small number of printing sheets, the warm-up time occupies most of processing time. Accordingly, the device with shorter warm-up time is preferentially restored from the sleep state, or the device that has operated up to the most recent time is preferentially restored from the sleep state, thereby resulting in shorter start-up time. Therefore, the time from the input of job to the output of print results can be shortened, resulting in efficient operation.

<Distributing Method of Processing>

At step S1703 of FIG. 17, a job is distributed over a plurality of multi-function devices making up the cluster system. A distribution method for use herein has some influence on the processing time. For example, if a large quantity of processing is assigned to the device that is being warmed up, the start of processing is delayed by an amount of warm-up time, and therefore the end of processing is also delayed. To end the processing earliest, the processing may be assigned to each device so that the processing of each device can be ended almost simultaneously. Thus, at step S1703, a part of job is assigned to each device so that the difference between the processing end time of the device that ends the processing earliest and the processing end time of the device that ends the processing latest may be shortest.

To this end, the job is distributed in the following way. Herein, a print job is supposed to include plural copies. If such print job is performed by the cluster system, the job is allocated to each device in a unit of page or a unit of copy.

In a state where the step S1703 of FIG. 17 is being performed, the multi-function devices making up the cluster system are all in the stand-by state, or started to return from the sleep state. For the device that is started to return from the sleep state, the warm-up time of the device is obtained by the cluster system controller. The warm-up time is registered in the device management server 320.

And the device that is already in the stand-by state and can perform the job immediately is assigned with a job which the device during the warm-up can perform until the end of warm-up. That is, the device in the stand-by state is enabled to perform the printing of a printable number of copies within a warm-up time of another device.

And a remaining job is distributed evenly to the multi-function devices in the cluster system. However, when the difference in performance between devices is remarkable, the job is allocated to each device to have the even processing time in view of the difference in performance.

Specifically, the job is distributed to each device so that the job processing may be ended substantially at the same time in the above way. For example, there are three multi-function devices A, B and C making up the cluster system, a device C is supposed to be in the sleep state at the time when a print job for five copies arises. In this case, after the device C is restored from the sleep state, the job that can be performed while the device C is in the warm-up is assigned to the devices A and B, and the remaining is allocated evenly. Accordingly, two copies are allocated to each of the devices A and B, and one copy is allocated to the device C.

For the simplification of processing, the job may be distributed so that the allocation of job to the device C that is returned to the stand-by state is less than the allocation of job to each of the devices A and B which have already been in the standby state.

<Transfer to Sleep State (FIG. 18)>

The cluster system constructed in the above way is not always performing the processing continuously. Therefore, in an idle time, each device is transferred to the energy saving state to prevent a waste of power or the exhaustion of the device.

Note that the multi-function device incorporated into the cluster system is notified of that incorporation from the cluster system management device. And it is firstly determined whether or not each multi-function device is incorporated into the cluster system and in cluster operation when the sleep condition intrinsic to the device itself is met. If not incorporated into cluster system, the multi-function device directly transfers to the sleep state.

On one hand, if incorporated into the cluster system, the multi-function device does not transfer to the sleep state. The multi-function device incorporated into the cluster system transfers to the sleep state in accordance with the procedure of FIG. 18, upon an instruction from the cluster system controller to transfer to a sleep mode.

FIG. 18 is a flowchart for explaining the operation for transferring the multi-function device that is making the clustering operation to the energy saving state.

In FIG. 18, first of all, at step S1801, the sleep time is checked at every period of time. The sleep time is the elapse time from the time when the device is operated lastly, for example, and when the sleep time reaches a set value, the sleep time is judged to have expired.

Herein, if the sleep time has expired, the procedure proceeds to step S1802. The step S1802 is intended to acquire the sleep conditions preset in the device management server 320, in which the short lifetime, short service time and short warm-up time are settable. The short service time means that the stand-by time is long, and the time used is short. This is different depending on the function or performance of the device. For example, if the device has the higher performance, the service time is shorter.

Some of these standards are appropriately selected, and it is determined whether or not the selected standards are consistent with predetermined conditions to decide the device to be slept. For example, in the case where the device lifetime is preferential, the device having a device lifetime below a predetermined time is decided as the device to be slept at steps S1803 and S1804. Alternatively in order to increase the effect of economy in power consumption, the service time is selected for the reference. In a process following the step S1803, the device having the service time below a predetermined time is decided as the device to be slept. Also, in order to shorten the time taken for returning from the sleep state, the warm-up time is selected for the reference, and the device having warm-up time shorter than a predetermined time is decided as the device to be slept. The sleep condition and the sleep time are set for each cluster system, and held by the device management server 320.

In order to place each device in the sleep state efficiently, a plurality of standards may be selected. In the case where a plurality of standards are selected to set the values, a weighted mean of set values is calculated and converted into a unique index, and the device with the index satisfying a predetermined condition is decided at the following steps.

In this embodiment, an instance where the service time is selected for the reference, and the device with shorter service time enters the sleep operation will be described below using the system of FIG. 1.

At step S1803, it is checked whether or not the device 100 (device A) is matched with the sleep condition. If not matched, the next device 410 (device B) is checked. In this way, the sleep condition is checked for all the multi-function devices included in the cluster system. The sleep condition to be checked is transmitted to the device management server 320 at step S1609 of FIG. 16.

On the other hand, if the condition is met at step S1803, the procedure proceeds to step S1805, where the device 100 is set to be in the sleep state. For example, a sleep command is given to the hard disk of the device 100 to stop a spindle motor, lower the temperature of the fixing device in the printer portion, or turn off the power except for the main CPU on the control substrate within the device, so that the device 100 is placed in the sleep state. In this way, the total power consumption of the device 100 is reduced in the energy saving operation. At this time, the device management server 320 memorizes which device has transferred to the sleep state. If any of the multi-function devices serves as the cluster system controller, the information regarding the device that has transferred to the sleep state is transmitted to the device management server 320.

Similarly, at step S1804, it is checked whether or not the device 410 is matched with the sleep condition, and if matched, the sleep setting S1806 is performed in the same manner as the step S1805.

On the other hand, if none of the devices satisfy the condition, and there is no other device connected, the energy saving operation check is ended.

In FIG. 18, only one device is slept. However, the procedure may proceed to step S1804 to determine the sleep condition for a plurality of devices, after the sleep setting at step S1805. In this case, all the devices conforming to the condition transfer to the sleep condition.

The sleep condition is set such that the clustering operation can be started efficiently and in short time. For example, the processing time of the job with smaller number of printing the sheet has a warm-up time occupying most of the job execution time. Accordingly, in the cluster system in which the print job with smaller number of printing the sheet in one job frequently occurs, the multi-function device with short warm-up time is preferentially placed in the sleep state, so that the time taken to return from the sleep state can be shortened. As a result, the output of print results can be expedited and becomes more efficient.

As described above, with this embodiment, in the multi-function device for clustering, the condition for entering the sleep state of energy saving operation can be set. The multi-function device transferring to the sleep state can be decided in accordance with the setting, in view of the efficiency as the cluster system, in the cluster system controller rather than each device. Therefore, the device transferring to the sleep state can be decided by setting the warm-up time as the sleep condition, so that the device can return from the sleep state promptly.

Note that the procedure of FIG. 18 is applicable regardless of whether the configuration of the cluster system is decided statically or dynamically. When the cluster system is decided statically, the multi-function devices managed to transfer to the sleep state in accordance with the procedure of FIG. 18 are limited to those included in the predetermined cluster system. When the cluster system is decided dynamically, the multi-function devices managed to transfer to the sleep state in accordance with the procedure of FIG. 18 are intended to be all those possibly included in the predetermined cluster system. In either case, the multi-function devices that are controlled in accordance with the procedure of FIG. 18 are registered in the device management server 320, and recognized by the execution subject of the procedure of FIG. 18 when starting the procedure.

<Effects of the System in this Embodiment>

As described above, with this embodiment, it is possible to set the sleep conditions, including the warm-up time of the device, the functions executable by the device, the time when the device enters the sleep state, and the device is transferred to the sleep state by referring to the set conditions. In this way, the device to be slept can be decided with reference to the characteristics of each device and the processing efficiency of the cluster system. Therefore, the device can be slept without decreasing the processing efficiency of the cluster system.

Also, when the multi-function devices making up the cluster system are in the sleep state, the conditions in returning from that state are settable, the device that is restored from the sleep state is decided by referring to the set conditions. Thereby, the clustering operation can be performed efficiently by deciding the multi-function device that is restored from the sleep state.

Also, an installation procedure manual in installing the multi-function devices is automatically downloaded by the file server when the device is connected to the network, displayed on the operation portion of the device, as an online manual, possibly with the operation buttons, and the data of the online manual at the end of installation is automatically deleted, whereby the programs unnecessary for the normal operation can be employed without being resident.

At the end of installation, the machine number, a list of available functions, the operation power, and the processing speed of the multi-function device can be automatically registered in the retrieval server on the network and managed.

The application employed by the user or the relevant data can be downloaded from the file server connected on the network into the multi-function system, whereby the memory capacity required for the system can be decreased.

Also, the application or driver software can be registered in the common file server and shared to utilize the software resources effectively, whereby the version up operation may be made for only one server to provide the latest software at all times.

At the time of installation, the online manual data is automatically downloaded from the file server, whereby the time for installation operation can be shorter than conventionally. After the end of installation operation, the online manual data for installation procedure is automatically deleted, whereby there is no need of storing the files or data unnecessary for the actual operation in the device, and the memory mounted can be effectively utilized.

Further, in deleting the online manual data, the machine number, the list of available functions, and the accessory name of the multi-function device are automatically registered in the retrieval server, and thereby can be effectively utilized from other devices connected to the network.

[Other Embodiment]

In the above embodiment, the system program is registered, retrieved, and acquired via the file server on the network. However, the system program may be registered, retrieved and acquired using a Web server on the Internet.

In the embodiment, the system program (including a driver software) for controlling the whole system is downloaded. However, an image processing program for OCR, color conversion and gradation correction for use in the multi-function device may be downloaded in the similar manner.

In the embodiment, the machine number of the multi-function device is registered in the retrieval server 310 on the network. However, it may be registered in the device management server 320 with the same effect.

In the embodiment, the energy saving condition is set in the device management server 320 automatically when the device makes the settings. However, the manager may set the sleep condition from the operation portion of the device to enable the device management server to read out the set condition at every fixed time and check it.

Note that the invention may be applied to the system composed of a plurality of devices (e.g., host computer, interface unit, reader, printer) or a single device (e.g., copying machine, facsimile device).

The object of the invention can be realized in such a manner that a storage medium (or recording medium) storing a program code of software for implementing the functions of the previous embodiment is supplied to the system or device, and the computer (or CPU or MPU) for the system or device reads out the program code stored in the storage medium and executes it. In this case, the program code itself read from the storage medium implements the functions in the previous embodiment, and the storage medium storing the program code constitutes the invention. The invention covers the cases where the computer executes the read program code to implement the functions in the previous embodiment, and an operating system (OS) working on the computer may perform a part or all of the practical processing in accordance with an instruction of the program code to implement the functions in the previous embodiment.

Further, the invention covers a case where after a program code read from the storage medium is written into a function extension card inserted into the computer or the memory equipped for a function extension unit connected to the computer, the CPU provided for the function extension card or the function extension unit performs a part or all of the practical processing in accordance with an instruction of the program code to implement the functions in the previous embodiment.

When the invention is applied to the storage medium, the storage medium may store the program code corresponding to the flowchart as shown above.

As many apparently widely different embodiments of the present invention can be made without departing from the spirit and scope thereof, it is to be understood that the invention is not limited to the specific embodiments thereof except as defined in the appended claims.

What is claimed is:

1. A control device that controls a cluster operation of a plurality of devices, comprising:
   a determination portion that determines whether a required number of devices for the cluster operation are in a stand-by state;
   a restoring portion that restores a device by transferring the device from an energy saving state to a stand-by state, wherein the restoring is based on a determination by the determination portion; and
   a distribution portion that distributes a job to each device in the cluster operation based on a sum of devices reaching said required number,
   wherein the sum of devices is the addition of the number of devices in the stand-by state and the number of devices transferring to the standby state by said restoring portion, and
   wherein said restoring portion determines a device to be restored among a plurality of devices in accordance with a specified restoring condition, then sets up the determined device to restore.

2. The control device according to claim 1, wherein said restoring condition includes a warm-up time for the device to return to the stand-by state, and/or the last operation time and/or the functions provided for the device.

3. The control device according to claim 1, wherein the restoring condition is registered in a server,
   wherein said control device further comprises an acquisition portion that acquires the restoring condition registered in the server, and
   wherein, based on the acquired restoring condition, said restoring portion restores a device by transferring the device from the energy saving state to the stand-by state.

4. The control device according to claim 1, wherein the control device is embedded in a printer.

5. A control device that controls a cluster operation of a plurality of devices, comprising:
   a selecting portion; and
   a distribution portion,
   wherein, if the number of devices in a stand-by state is less than a required number of devices needed for the cluster operation, said selecting portion selects devices from among the devices in an energy saving state for the remaining number of devices needed in the cluster, and
   wherein, after selection, said distribution portion distributes a job to each device in the stand-by state and each selected device in the energy saving state, and
   wherein said distribution portion distributes the job so that an allocated portion of job to each device in the energy saving state that is selected by said selecting portion is less than an allocated portion of job to each device in the stand-by state.

6. The control device according to claim 5, wherein said distribution portion distributes the job to said each device in the stand-by state and each selected device in the energy saving state on the basis of the time for which the device in the energy saving state that is selected by said selecting portion gets to the stand-by state.

7. A control method for controlling a cluster operation of a plurality of devices, comprising:
   a determining step of determining whether a required number of devices for the cluster operation are in a stand-by state;
   a restoring step of restoring a device by transferring the device from an energy saving state to a stand-by state, wherein the restoring is based on a determination by the determining step; and
   a distribution step of distributing a job to each device in the cluster operation based on a sum of devices reaching said required number,
   wherein the sum of the devices is the addition of the number of devices in the stand-by state and the number of devices transferring to the stand-by state in said restoring step, and
   wherein said restoring step determines a device to be restored among a plurality of devices in accordance with a specified restoring condition, then sets up the determined device to restore.

8. The control method according to claim 7, wherein said restoring condition includes a warm-up time for the device to return to the stand-by state, and/or a last operation time and/or functions provided for the device.

9. The control method according to claim 7, wherein the restoring condition is registered in a server,
   wherein said control method further comprises an acquisition step of acquiring the restoring condition registered in the server, and
   wherein, based on the acquired restoring condition, a device is restored by transferring the device from the energy saving state to the stand-by state in said restoring step.

10. The control method according to claim 7, wherein the control method is preformed in a printer.

11. A control method for controlling a cluster operation of a plurality of devices, comprising:
    a selecting step; and
    a distribution step,
    wherein, if the number of devices in a stand-by state is less than a required number of devices needed for the cluster operation, said selecting step selects devices from among the devices in an energy saving state for the remaining number of devices needed in the cluster, and
    wherein, after selection, said distribution step distributes a job to each device in the stand-by state and each selected device in the energy saving state, and
    wherein said distribution step distributes the job so that an allocated portion of job to each device in the energy saving state that is selected at said selecting step is less than an allocated portion of job to each device in the stand-by state.

12. The control method according to claim 11, wherein said distribution step distributes the job to said each device in the stand-by state and each selected device in the energy saving state on the basis of the time for which the device in the energy saving state that is selected at said selecting step gets to the stand-by state.

13. A computer executable program stored on a computer readable medium, comprising:
    code for a determining step to determine whether a required number of devices for a cluster operation are in a stand-by state;
    code for a restoring step to restore a device by transferring the device from an energy saving state to a stand-by state, wherein the restoring is based on a determination by the determining step; and
    code for a distribution step to distribute a job to each device in the cluster operation based on a sum of devices reaching said required number,
    wherein the sum of devices is the addition of the number of devices in the stand-by state and the number of devices transferring to the stand-by state in said restoring step, and
    wherein said restoring step determines a device to be restored among a plurality of devices in accordance with a specified restoring condition, then sets up the determined device to restore.

14. The computer program according to claim 13, wherein said restoring condition includes a warm-up time for the device to return to the stand-by state, and/or the last operation time and/or the functions provided for the device.

15. The program according to claim 13, wherein the restoring condition is registered in a server,
wherein said program further comprises an acquisition step code of acquiring the restoring condition registered in the server, and
wherein, based on the acquired restoring condition, a device is restored by transferring the device from the energy saving state to the stand-by state in said restoring step.

16. The program according to claim 13, wherein the program is preformed by a computer embedded in a printer.

17. A computer executable program stored on a computer readable medium, comprising:
code for a selecting step; and
code for a distribution step,
wherein, if the number of devices in a stand-by state is less than a required number of devices needed for a cluster operation, said selecting step selects devices from among the devices in an energy saving state for the remaining number of devices needed in the cluster, and
wherein, after selection, said distribution step distributes a job to each device in the stand-by state and each selected device in the energy saving state, and
wherein said code for a distribution step distributes the job so that an allocated portion of job to each device in the energy saving state that is selected at said selecting step is less than an allocated portion of job to each device in the stand-by state.

18. The computer executable program according to claim 17, wherein said distribution step distributes the job to said each device in the stand-by state and each selected device in the energy saving state on the basis of the time for which the device in the energy saving state that is selected at said selecting step gets to the stand-by state.

19. A network device having a printing unit in which a cluster operation can be realized in cooperation of a plurality of network devices, each of which having a printing unit, comprising:
a determination portion that determines whether the network device is included in a cluster system, wherein the determination is made when conditions, being intrinsic to the device itself, for transferring to an energy saving state are met; and
a state transfer portion that transfers the network device to the energy saving state, wherein if the determination portion determines that the network device is included in the cluster system, the state transfer portion transfers the network device to an energy saving state only in accordance with an instruction from an external device, irrespective of said conditions.

20. A control method for a network device having a printing unit in which a cluster operation can be realized in cooperation of a plurality of network devices, each of which having a printing unit, comprising:
a determination step of determining whether the network device is included in a cluster system, wherein the determination is made when conditions, being intrinsic to the device itself, for transferring to an energy saving state are met; and
a state transfer step of transferring the network device to the energy saving state, wherein if the determination step determines that the network device is included in the cluster system, the state transfer step transfers the network device to an energy saving state only in accordance with an instruction from an external device, irrespective of said conditions.

21. A computer executable program stored on a computer readable medium, comprising:
code for a determination step to determine whether a network device having a printing unit is included in a cluster system, wherein the determination is made when conditions, being intrinsic to the device itself, for transferring the network device to an energy saving state are met; and
code for a state transfer step to transfer the network device to the energy saving state, wherein if the determination step determines that the network device is included in the cluster system, the code for a state transfer step transfers the network device to an energy saving state only in accordance with an instruction from an external device, irrespective of said conditions.

* * * * *

UNITED STATES PATENT AND TRADEMARK OFFICE
CERTIFICATE OF CORRECTION

| | | |
|---|---|---|
| PATENT NO. | : 7,116,434 B2 | Page 1 of 1 |
| APPLICATION NO. | : 09/921556 | |
| DATED | : October 3, 2006 | |
| INVENTOR(S) | : Abe | |

It is certified that error appears in the above-identified patent and that said Letters Patent is hereby corrected as shown below:

SHEET 5:
FIG. 5, "Rturn" should read -- Return--.

COLUMN 5:
Line 3, "tens" should read -- tens of --.

COLUMN 12:
Line 8, "automatically them" should read -- them automatically --.

COLUMN 21:
Line 15, "standby" should read -- stand by --.

COLUMN 22:
Line 24, "preformed" should read -- performed --.

COLUMN 23:
Line 14, "preformed" should read -- performed --.

Signed and Sealed this

Eighteenth Day of September, 2007

JON W. DUDAS
*Director of the United States Patent and Trademark Office*